United States Patent
Chen et al.

(10) Patent No.: US 12,530,056 B2
(45) Date of Patent: Jan. 20, 2026

(54) HINGE APPARATUS AND ELECTRONIC DEVICE

(71) Applicant: HONOR DEVICE CO., LTD., Shenzhen (CN)

(72) Inventors: Longqi Chen, Shenzhen (CN); Jiangwei Li, Shenzhen (CN); Yameng Wei, Shenzhen (CN); Xin Liu, Shenzhen (CN); Xiaowen You, Shenzhen (CN); Lizhi Xiong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 217 days.

(21) Appl. No.: 18/576,916

(22) PCT Filed: Aug. 14, 2023

(86) PCT No.: PCT/CN2023/112979
§ 371 (c)(1),
(2) Date: Jan. 5, 2024

(87) PCT Pub. No.: WO2024/124929
PCT Pub. Date: Jun. 20, 2024

(65) Prior Publication Data
US 2025/0044841 A1    Feb. 6, 2025

(30) Foreign Application Priority Data
Dec. 16, 2022 (CN) .......................... 202211620764.1

(51) Int. Cl.
*G06F 1/16* (2006.01)
*H04M 1/02* (2006.01)

(52) U.S. Cl.
CPC ........ *G06F 1/1681* (2013.01); *H04M 1/0216* (2013.01)

(58) Field of Classification Search
CPC .... G06F 1/1615; G06F 1/1616; G06F 1/1681; H04M 1/0206; H04M 1/021; H04M 1/0235; H04M 1/0216; H04M 1/0222
See application file for complete search history.

(56) References Cited

U.S. PATENT DOCUMENTS 10,036,188 B1    7/2018 Yao et al.
10,231,347 B2 *  3/2019 Seo .................. E05D 11/082
(Continued)

FOREIGN PATENT DOCUMENTS

CN    203717618 U    7/2014
CN    106969025 A    7/2017
(Continued)

*Primary Examiner* — Anthony Q Edwards
(74) *Attorney, Agent, or Firm* — WOMBLE BOND DICKINSON (US) LLP

(57) ABSTRACT

Embodiments of this application provide a hinge apparatus. a shaft cover, including accommodation recess parts; bases, disposed in the accommodation recess parts, where each base includes relief spaces and first adapter parts, the first adapter parts face the relief spaces, the base includes a synchronous slider and a limiting guide track, the limiting guide track is connected to the shaft cover, the limiting guide track is disposed at a side that is of the synchronous slider and that faces away from the shaft cover, and the synchronous slider is slidably connected to the limiting guide track; and swing arm assemblies, each including swing arm bodies and second adapter parts. A connection end of each swing arm body is close to the base. A free end of the swing arm body is away from the base. At least part of the connection end is located in the relief space.

20 Claims, 16 Drawing Sheets

(56) References Cited

U.S. PATENT DOCUMENTS

| | | | |
|---|---|---|---|
| 10,928,864 B1* | 2/2021 | Sanchez | E05D 11/1028 |
| 2015/0020351 A1 | 1/2015 | Lin | |
| 2015/0153785 A1 | 6/2015 | Kao et al. | |
| 2018/0239402 A1 | 8/2018 | Wang et al. | |
| 2021/0096607 A1* | 4/2021 | Hallar | G06F 1/1616 |

FOREIGN PATENT DOCUMENTS

| | | |
|---|---|---|
| CN | 114060398 A | 2/2022 |
| CN | 114658753 A | 2/2022 |
| CN | 114885054 A | 8/2022 |
| CN | 217381267 U | 9/2022 |
| CN | 115325016 A | 11/2022 |
| CN | 115405615 A | 11/2022 |
| CN | 115614373 A | 1/2023 |

* cited by examiner

HINGE APPARATUS AND ELECTRONIC DEVICE

CROSS-REFERENCE TO RELATED APPLICATIONS

This application is a national stage of International Application No. PCT/CN2023/112979, filed on Aug. 14, 2023, which claims priority to Chinese Patent Application No. 202211620764.1, filed on Dec. 16, 2022. The disclosures of both of the aforementioned applications are hereby incorporated by reference in their entireties.

TECHNICAL FIELD

Embodiments of this application relate to the field of terminal technologies, and in particular, to a hinge apparatus and an electronic device.

BACKGROUND

A display screen of an electronic device is configured to present image information to users. In some usage scenarios, users expect that the display screen of the electronic device can have a larger display area. Currently, the electronic device uses a single screen for display. A lager display area indicates a larger size of the electronic device, resulting in loss of portability of the electronic device.

With development of flexible display screen technologies, an electronic device may use a foldable structure to balance the size and display area of the electronic device. For example, two frames may rotate relative to each other about a hinge apparatus to be unfolded or folded. The two frames are covered by a flexible display screen. When the two frames are unfolded to a same plane, the flexible display screen is in an unfolded state and has a large display area. When the two frames are folded together, the flexible display screen is in a folded state, and a size of the electronic device is small. However, during unfolding or folding the electronic device, the frames have a problem of synchronization deviation in a rotating process, resulting in poor use experience with the electronic device.

SUMMARY

Embodiments of this application provide a hinge apparatus and an electronic device, to facilitate improvement of use experience with the electronic device.

A first aspect of this application provides a hinge apparatus. The hinge apparatus includes a shaft cover, bases, and swing arm assemblies. The shaft cover includes accommodation recess parts. The bases are disposed in the accommodation recess parts. Each base includes relief spaces and first adapter parts. The first adapter parts face the relief spaces. The base includes a synchronous slider and a limiting guide track. The limiting guide track is connected to the shaft cover. The limiting guide track is disposed at a side that is of the synchronous slider and that faces away from the shaft cover. The synchronous slider is slidably connected to the limiting guide track. The swing arm assemblies each include swing arm bodies and second adapter parts. Each swing arm body includes a connection end and a free end. The connection end is close to the base. The free end is away from the base. At least part of the connection end is located in the relief space. The second adapter parts are connected to the connection ends. The second adapter parts are rotatably connected to the first adapter parts. The second adapter parts are connected to the synchronous slider. The swing arm bodies rotate relative to the first adapter parts via the second adapter parts, to switch between a folded position and an unfolded position, and the second adapter parts synchronously drive the synchronous slider to move between a first position and a second position.

In the hinge apparatus according to embodiments of this application, the shaft cover can provide a mounting base for the bases and the swing arm assemblies. The shaft cover can protect the bases and the swing arm assemblies. Each base includes a synchronous slider and a limiting guide track. The synchronous slider may slide relative to the limiting guide track. The limiting guide track may form a positional limitation to the synchronous slider. The base further includes relief spaces and first adapter parts. Part of each swing arm body of the swing arm assembly is located in the relief space, to facilitate increasing compactness of a structure of the hinge apparatus. The second adapter parts of the swing arm assemblies are rotatably connected to the first adapter parts of the bases. The second adapter parts are connected to the synchronous slider. When the swing arm bodies and the second adapter parts rotate relative to the first adapter parts, the second adapter parts synchronously drive the synchronous slider to move relative to the limiting guide track, so that synchronization of a flipping process of the swing arm bodies and a movement process of the synchronous slider can be achieved, and the synchronous slider can achieve synchronization of flipping movements of the swing arm bodies on two sides of the shaft cover, to ensure that the frames connected to the swing arm bodies can rotate synchronously, thereby facilitating improvement of convenience as well as experience and satisfaction during use of the electronic device.

In a possible implementation, the first adapter parts are arc slide ways. An axial direction of the first adapter part is the same as a movement direction of the synchronous slider. The first adapter parts are communicated with the relief spaces. The second adapter parts are arc structures. At least part of each second adapter part is located in the first adapter part. An axis of the first adapter part is coaxial with an axis of the second adapter part. A shape of the first adapter part matches a shape of the second adapter part.

In a possible implementation, each of two sides of the swing arm body is provided with the first adapter part and the second adapter part in the movement direction of the synchronous slider.

In a possible implementation, the synchronous slider includes first helical surfaces. The first helical surfaces are arranged corresponding to the first adapter parts. Each first helical surface is located at a side that is of the first adapter part and that faces away from the relief space. Each second adapter part includes a second helical surface. The first helical surfaces are in contact with the second helical surfaces. Helix directions of the first helical surfaces on the two sides of the swing arm body are identical, and helix directions of the second helical surfaces on the two sides of the swing arm body are identical. When the second adapter parts rotate relative to the first adapter parts, the first helical surfaces and the second helical surfaces slide relative to each other synchronously, to enable the second adapter parts to drive the synchronous slider to move.

In a possible implementation, the limiting guide track includes first arc surfaces. The synchronous slider includes second arc surfaces. Arc slide ways are formed between the first arc surfaces and the second arc surfaces. The second adapter parts include third arc surfaces and fourth arc surfaces. The first arc surfaces are in contact with the third arc surfaces. The second arc surfaces are in contact with the fourth arc surfaces. The first helical surfaces are connected to the second arc surfaces. The second helical surfaces connect the fourth arc surfaces to the second arc surfaces.

In a possible implementation, the synchronous slider includes guide recesses. The guide recesses face the limiting guide track. The guide recesses are communicated with the first adapter parts. The limiting guide track includes guide parts. The guide parts are located in the guide recesses. Shapes of the guide parts match shapes of the guide recesses.

In a possible embodiment, an inner wall of each guide recess is arc-shaped. A surface that is of each guide part and that faces the guide recess is arc-shaped. An axis of the guide recess is coaxial with an axis of the guide part.

In a possible implementation, the limiting guide track includes two limiting guide members. The two limiting guide members are spaced apart in the movement direction of the synchronous slider to form a first relief part between the two limiting guide members. The synchronous slider includes two end connection parts and an intermediate connection part. The two end connection parts are spaced apart in the movement direction of the synchronous slider. The intermediate connection part connects the two end connection parts. The synchronous slider includes second relief parts located at two sides of the intermediate connection part. The first relief part and the second relief parts form the relief spaces. The end connection parts are slidably connected to the corresponding limiting guide members. The first adapter parts are disposed between the end connection parts and the limiting guide members.

In a possible implementation, each limiting guide member includes a fixed part and two connecting support legs. The fixed part connects the two connecting support legs. The fixed part is connected to the shaft cover. The end connection parts are slidably connected to the corresponding connecting support legs. The first adapter parts are disposed between the end connection parts and the connecting support legs.

In a possible implementation, the shaft cover includes a bottom plate, side plates, and support bosses. The bottom plate and the side plates form the accommodation recess parts. The support bosses are disposed on the bottom plate. The fixed parts are connected to the support bosses. The two support bosses are spaced part in the movement direction of the synchronous slider. The synchronous slider is disposed between the two support bosses.

In a possible implementation, each swing arm body includes two connecting support arms. The two connecting support arms are arranged in parallel in the movement direction of the synchronous slider. The two connecting support arms are slidably connected to each other. Each swing arm assembly further includes elastic members. Each elastic member is disposed between the two connecting support arms. The elastic members are disposed corresponding to the second adapter parts.

In a possible implementation, one of the connecting support arms includes an insertion block, and the other connecting support arm includes an insertion slot. The insertion block is inserted into the insertion slot in the movement direction of the synchronous slider.

In a possible implementation, each swing arm body includes limiting surfaces facing the second adapter parts, at least part of each limiting surface is located in the relief space, and a surface that is of the limiting guide track and that faces the relief space abuts against the limiting surface in the movement direction of the synchronous slider.

In a possible implementation, the hinge apparatus further includes elastic damping members. The elastic damping member is disposed on at least one side of the synchronous slider in the movement direction of the synchronous slider.

In a possible implementation, the elastic damping member includes an annular body. The annular body includes elastic arms and support arms. The two elastic arms are spaced apart. The support arms are connected to the two elastic arms. The elastic arms and the support arms are disposed alternately. One of the elastic arms is connected to the synchronous slider, and the other elastic arm is connected to at least one of the shaft cover and the limiting guide track.

In a possible implementation, the elastic damping member further includes connecting support arms. The elastic arms are connected to the connecting support arms. One of the connecting support arms on the elastic arms is connected to the synchronous slider, and the other connecting support arm on the elastic arm is connected to at least one of the shaft cover and the limiting guide track.

In a possible implementation, the elastic arm, the support arm, and the connecting support arm are an integrally formed structure.

In a possible implementation, the synchronous sliders are slidably connected to the shaft cover.

In a possible implementation, the shaft cover includes ribs. The ribs are located at a side that is of the synchronous slider and that faces away from the limiting guide track. The ribs abut against a surface that is of the synchronous slider and that faces away from the limiting guide track. The synchronous slider is slidably fitted to the ribs.

In a possible implementation, the shaft cover includes a bottom plate and side plates. The bottom plate and the side plates form the accommodation recess parts. The ribs are formed on the bottom plate. The limiting guide track is located at a side that is of the synchronous slider and that faces away from the bottom plate.

In a possible implementation, the side plates are provided with relief notches. When the swing arm bodies are located at the unfolded position, the relief notches accommodate the swing arm bodies.

A second aspect of this application provides an electronic device, including the hinge apparatus according to any one of the foregoing implementations.

REFERENCE NUMERALS

- 10. electronic device;
- 20. housing;
- 30. flexible display screen; 31. first display region; 32. second display region; 33. third display region;
- 40. frame;
- 50. hinge apparatus;
- 51. shaft cover; 51*a*. accommodation recess part;
- 511. bottom plate;
- 512. side plate; 512*a*. relief notch;
- 513. support boss;
- 514. rib;
- 52. base; 52*a*. relief space; 52*b*. first adapter part;
- 521. limiting guide track; 521*a*. first arc surface; 521*b*. guide part; 521*c*. first relief part; 5211. limiting guide member; 5211*a*. fixed part; 5211*b*. connecting support leg;
- 522. synchronous slider; 522*a*. first helical surface; 522*b*. second arc surface; 522*c*. guide recess; 522*d*. second relief part; 5221. end connection part; 5222. intermediate connection part;
- 53. swing arm assembly;
- 531. swing arm body; 531*a*. connection end; 531*b*. free end; 531*c*. limiting surface; 531*d*. accommodation space; 5311. connecting arm; 5311*a*. insertion block; 5311*b*. insertion slot;
- 532. second adapter part; 532*a*. second helical surface; 532*b*. third arc surface; 532*c*. fourth arc surface;
- 533. elastic member;
- 54. elastic damping member;
- 541. annular body; 5411. elastic arm; 5412. support arm;
- 542. connecting support arm;
- 100. connecting hole;
- X. width direction; and Y. length direction.

DESCRIPTION OF EMBODIMENTS

An electronic device in embodiments of this application may be referred to as user equipment (user equipment, UE), a terminal (terminal), or the like. For example, the electronic device may be a mobile terminal such as a tablet computer (portable android device, PAD), a personal digital assistant (personal digital assistant, PDA), a handheld device having a wireless communication function, a computing device, a vehicle-mounted device, a wearable device, a virtual reality (virtual reality, VR) terminal device, an augmented reality (augmented reality) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home), or a fixed terminal. A form of a terminal device is not specifically limited in embodiments of this application.

In an embodiment of this application, an example in which an electronic device is a handheld device having a wireless communication function is used for description. The handheld device having a wireless communication function may be, for example, a foldable screen device. The foldable screen device may be a foldable mobile phone including a foldable flexible display screen.

Figure 1:
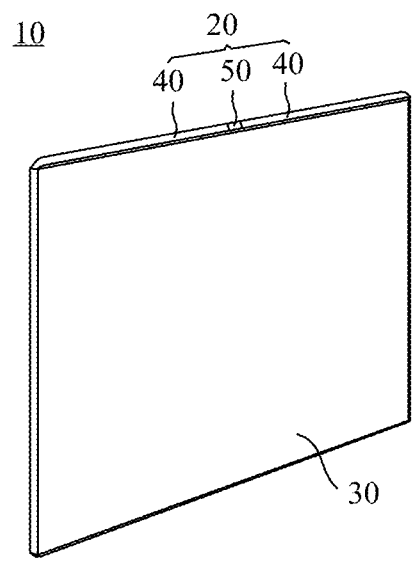
FIG. 1 is a schematic diagram of a structure of an electronic device in an unfolded state according to an embodiment of this application.
Figure 2:
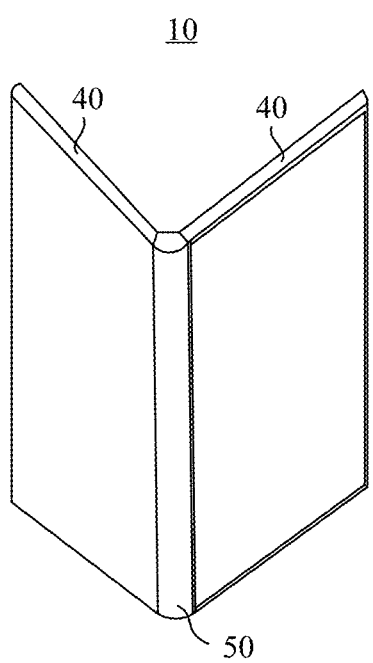
FIG. 2 is a schematic diagram of a structure of an electronic device in a semi-folded state according to an embodiment of this application.
Figure 3:
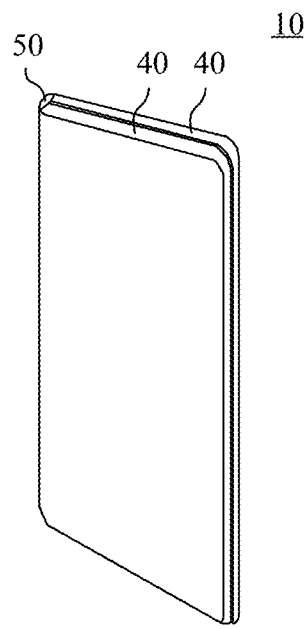
FIG. 3 is a schematic diagram of a structure of an electronic device in a folded state according to an embodiment of this application.

FIG. 1 schematically shows a structure of an electronic device 10 in an unfolded state according to an embodiment. FIG. 2 schematically shows a structure of the electronic device 10 in a semi-folded state. FIG. 3 schematically shows a structure of the electronic device 10 in a folded state. Refer to FIG. 1 to FIG. 3. The electronic device 10 includes a housing 20 and a flexible display screen 30. The housing 20 includes frames 40 and a hinge apparatus 50. The frames 40 are connected to the hinge apparatus 50. The frames 40 may be respectively disposed on two opposite sides of the hinge apparatus 50. The flexible display screen 30 is connected to the frames 40.

The frames 40 are rotatable relative to the hinge apparatus 50 to be folded. In this application, an example in which the electronic device 10 includes two frames 40 is used for description. When the two frames 40 are stacked, the electronic device 10 is in a folded state. When the two frames 40 in a stacked state move away from each other and are unfolded to a same plane, the electronic device 10 is in an unfolded state. A process in which the frames 40 change from a folded state to an unfolded state is an unfolding process, and a process in which the frames 40 change from an unfolded state to a folded state is a folding process.

In some implementations, each frame 40 may include a middle frame. The frames 40 may be connected to the hinge apparatus 50 via the middle frames.

Figure 4:
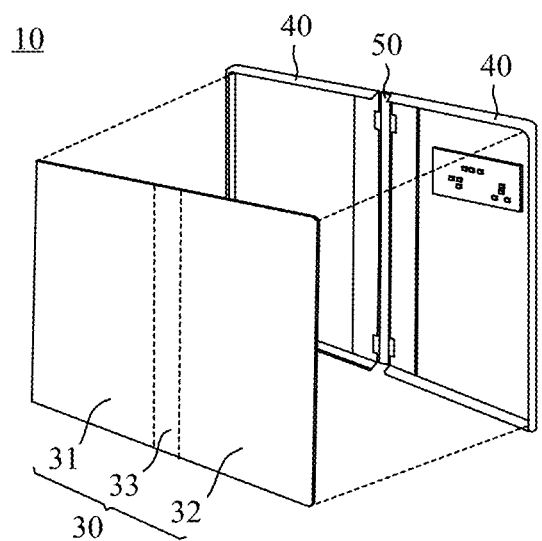
FIG. 4 is a schematic explosive view of a partial structure of an electronic device according to an embodiment of this application.

FIG. 4 schematically shows an explosive view of a partial structure of the electronic device 10 according to this application. Refer to FIG. 4. A flexible display screen 30 includes a display part for displaying image information. The flexible display screen 30 is bendable and may be folded under external force. When the electronic device 10 is in an unfolded state, the display part of the flexible display screen 30 is unfolded to present the image information to a user. The display part may include a first display region 31, a second display region 32, and a third display region 33. The first display region 31 and the second display region 32 are arranged corresponding to two frames 40, respectively. The third display region 33 may be arranged corresponding to a hinge apparatus 50.

When the two frames 40 are in a folded state, the display part is in a bent state. The first display region 31 and the second display region 32 of the display part may be stacked, and the third display region 33 may be bent into an arc state.

When the two frames 40 are in an unfolded state, the display part is in an unfolded state, and the first display region 31, the second display region 32, and the third display region 33 are in a flat state. The electronic device 10 may change an overall size by folding or unfolding and may have a large display area in an unfolded state.

Electronic components are provided in each of the two frames 40 of the electronic device 10, for example, the electronic components may include but are not limited to a processor, a memory, or a camera module. In some examples, main boards are disposed in the frames 40. The electronic components are disposed on the main boards. The main board may be a printed circuit board (printed circuit board, PCB).

Figure 5:
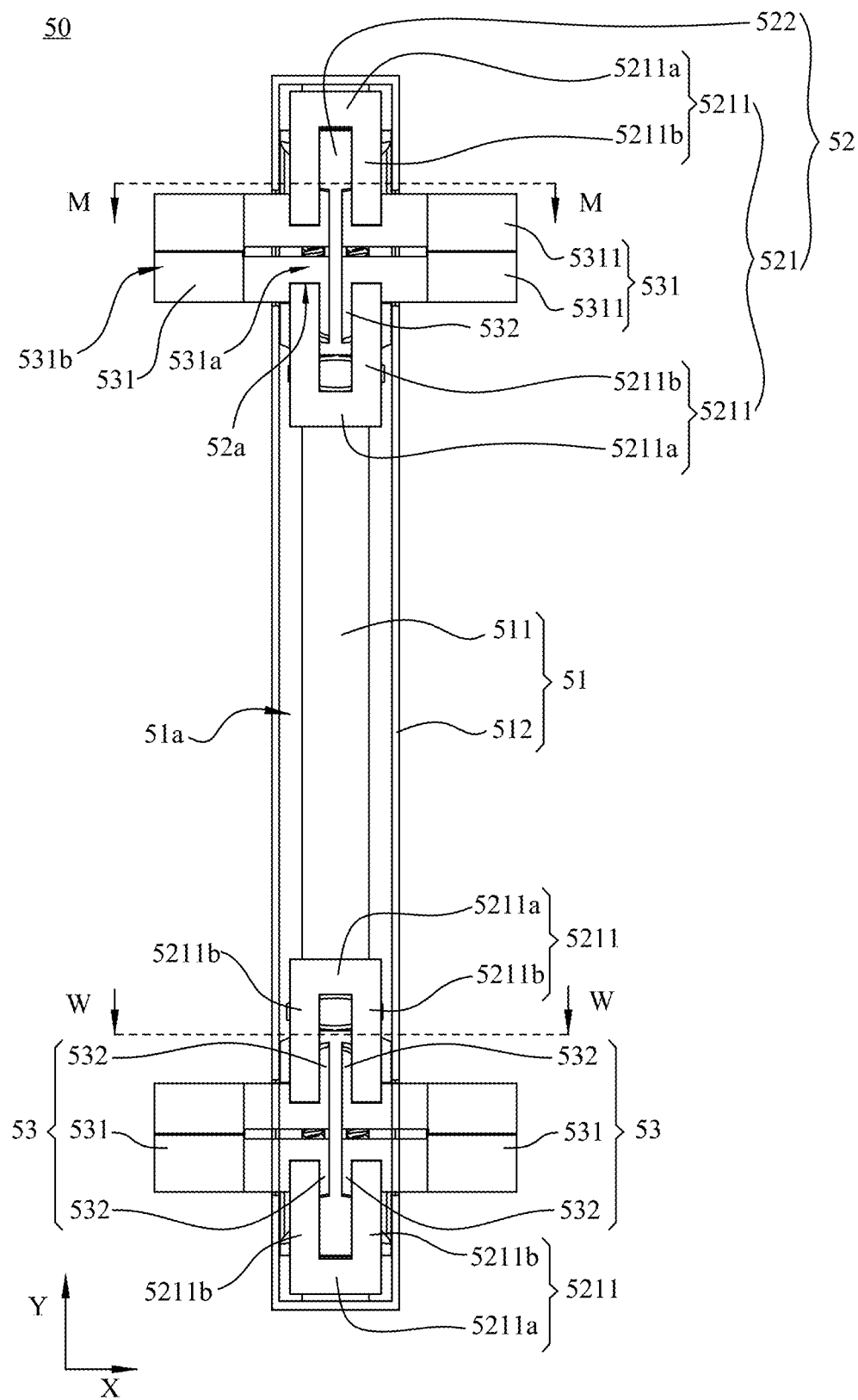
FIG. 5 is a schematic diagram of a structure of a hinge apparatus according to an embodiment of this application.

FIG. 5 schematically shows a structure of a hinge apparatus 50 according to this application. Refer to FIG. 4 and FIG. 5, the hinge apparatus 50 of this application includes a shaft cover 51. The shaft cover 51 may be located between the two frames 40. The shaft cover 51 may cover another structural part on the hinge apparatus 50, so that the electronic device 10 has a trim and aesthetic appearance. When the two frames 40 rotate relative to the hinge apparatus 50, a position of the shaft cover 51 may remain relatively fixed. In some examples, when the two frames 40 are in an unfolded state, the two frames 40 may cover the shaft cover 51 so that the shaft cover 51 is a concealed state. When the two frames 40 are in a folded state, at least part of the shaft cover 51 may be exposed out of the two frames 40 to be in a visible state. The shaft cover 51 can provide a mounting base for related structural parts of the hinge apparatus 50. In some examples, the shaft cover 51 may be a strip-shaped structure. For example, the frames 40 are respectively disposed on two sides of the shaft cover 51 in a width direction X of the shaft cover 51. The shaft cover 51 includes accommodation recess parts 51a. When the hinge apparatus 50 is used in the electronic device 10, the accommodation recess parts 51a of the shaft cover 51 may face the flexible display screen 30. In other words, a side that is of the shaft cover 51 and that faces the flexible display screen 30 may be provided with the accommodation recess parts 51a.

A material of the shaft cover 51 may be a metal material such as, but not limited to, stainless steel or titanium alloy.

The hinge apparatus 50 further includes bases 52. The bases 52 may be configured to provide a mounting base for other parts. In some possible implementations, the bases 52 may be detachably connected to the shaft cover 51 in a manner such as, but not limited to, using screws to connect the bases 52 to the shaft cover 51. The bases 52 are disposed in the accommodation recess parts 51a of the shaft cover 51. When the hinge apparatus 50 is used in the electronic device 10, the base 52 is located at the side that is of the shaft cover 51 and that faces the flexible display screen 30.

Figure 6:
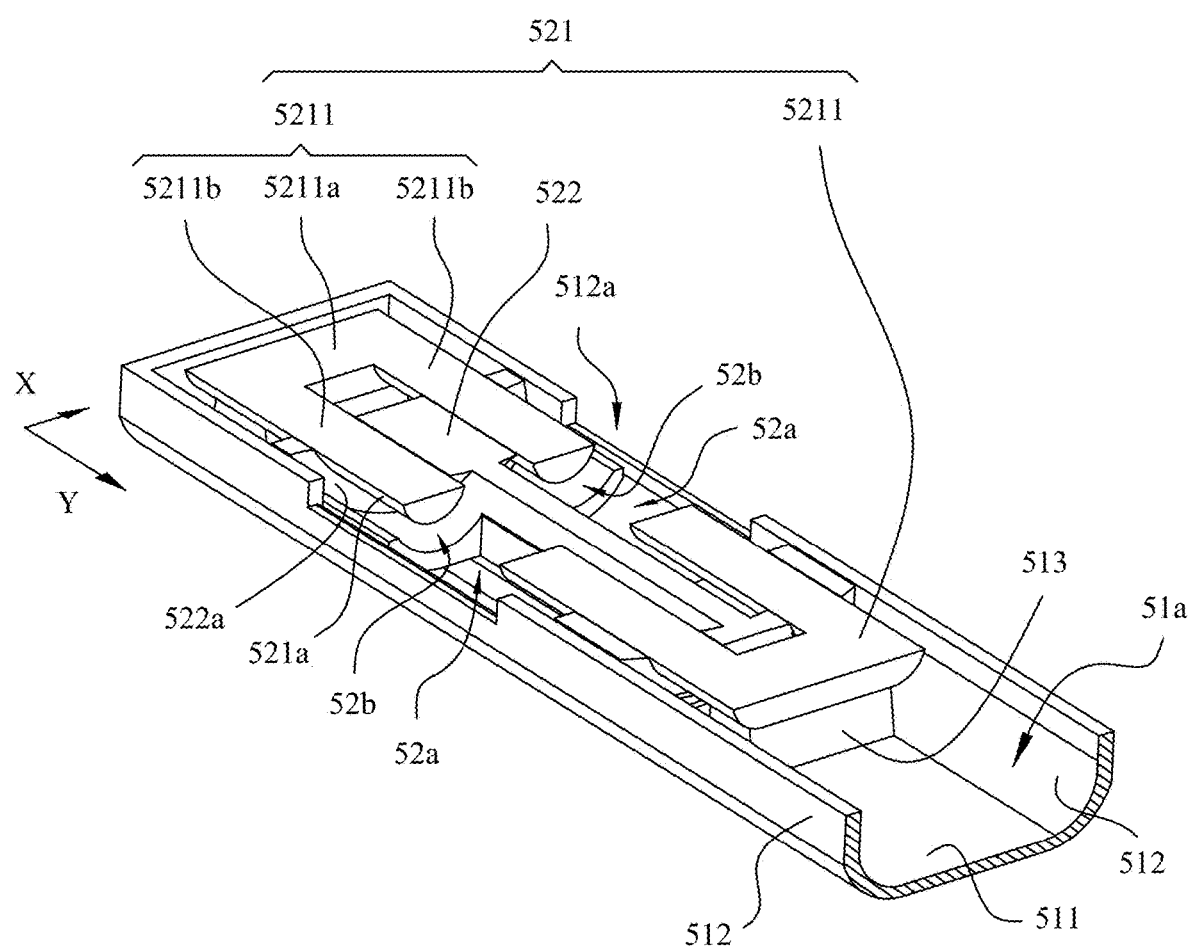
FIG. 6 is a schematic diagram of a partial structure of a hinge apparatus according to an embodiment of this application.

FIG. 6 schematically shows a partial structure of a hinge apparatus 50 according to this application. Refer to FIG. 5 and FIG. 6. The base 52 includes relief spaces 52a and first adapter parts 52b. The first adapter parts 52b face the relief spaces 52a. The base 52 includes a limiting guide track 521 and a synchronous slider 522. The limiting guide track 521 is connected to the shaft cover 51. The limiting guide track 521 is disposed at a side that is of the synchronous slider 522 and that faces away from the shaft cover 51. The synchronous slider 522 is slidably connected to the limiting guide track 521. After the limiting guide track 521 is connected to the shaft cover 51, the limiting guide track 521 can form a positional limitation on the synchronous slider 522, so that the synchronous slider 522 is less likely to separate from the limiting guide track 521 and the shaft cover 51. The limiting guide track 521 can guide the synchronous slider 522, to ensure accuracy of a movement direction of the synchronous slider 522, so that the synchronous slider 522 is less likely to deviate. For example, a movement direction of the synchronous slider 522 may be the same as a length direction Y of the shaft cover 51.

Figure 7:
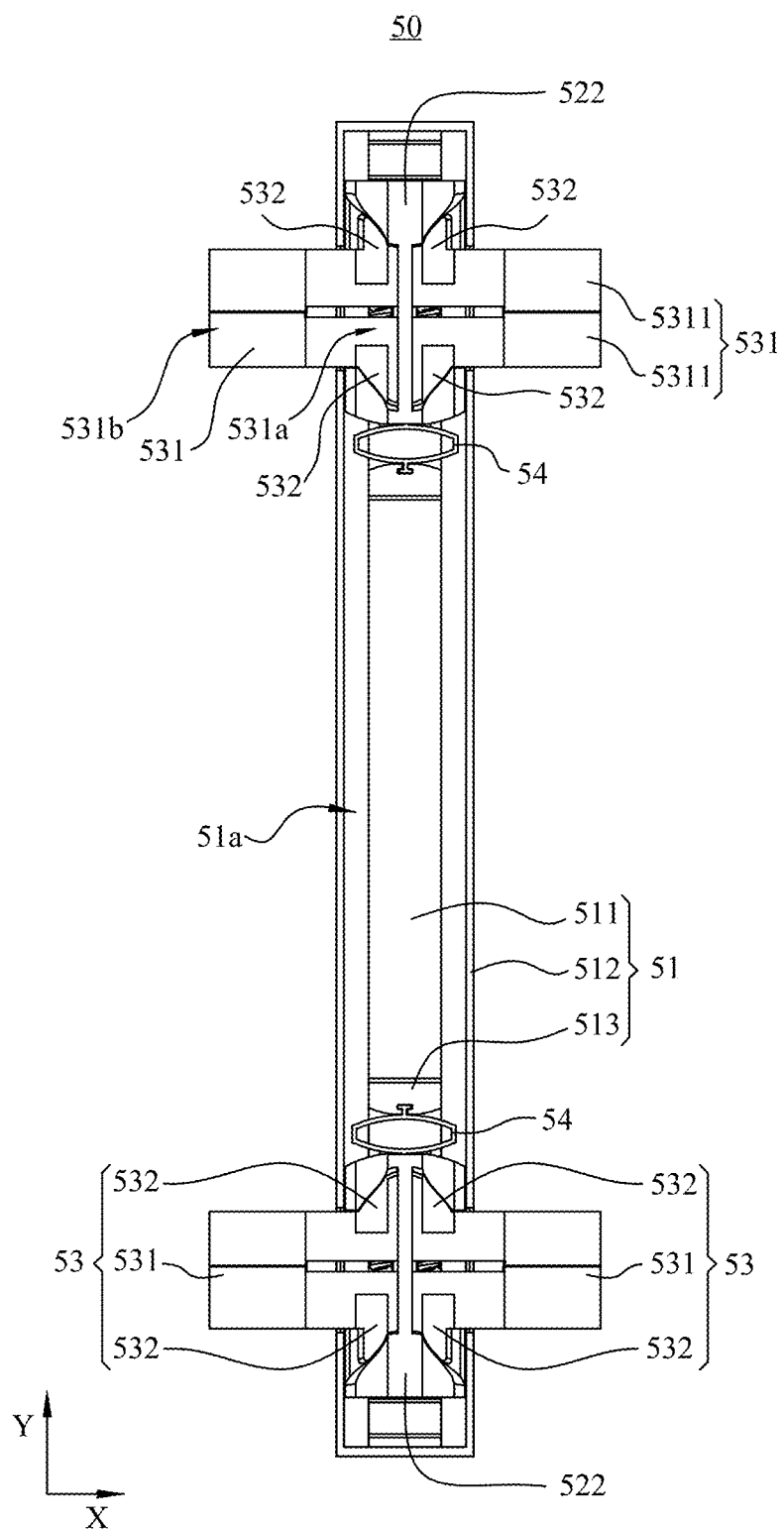
FIG. 7 is a schematic diagram of a partial structure of a hinge apparatus according to an embodiment of this application.
Figure 8:
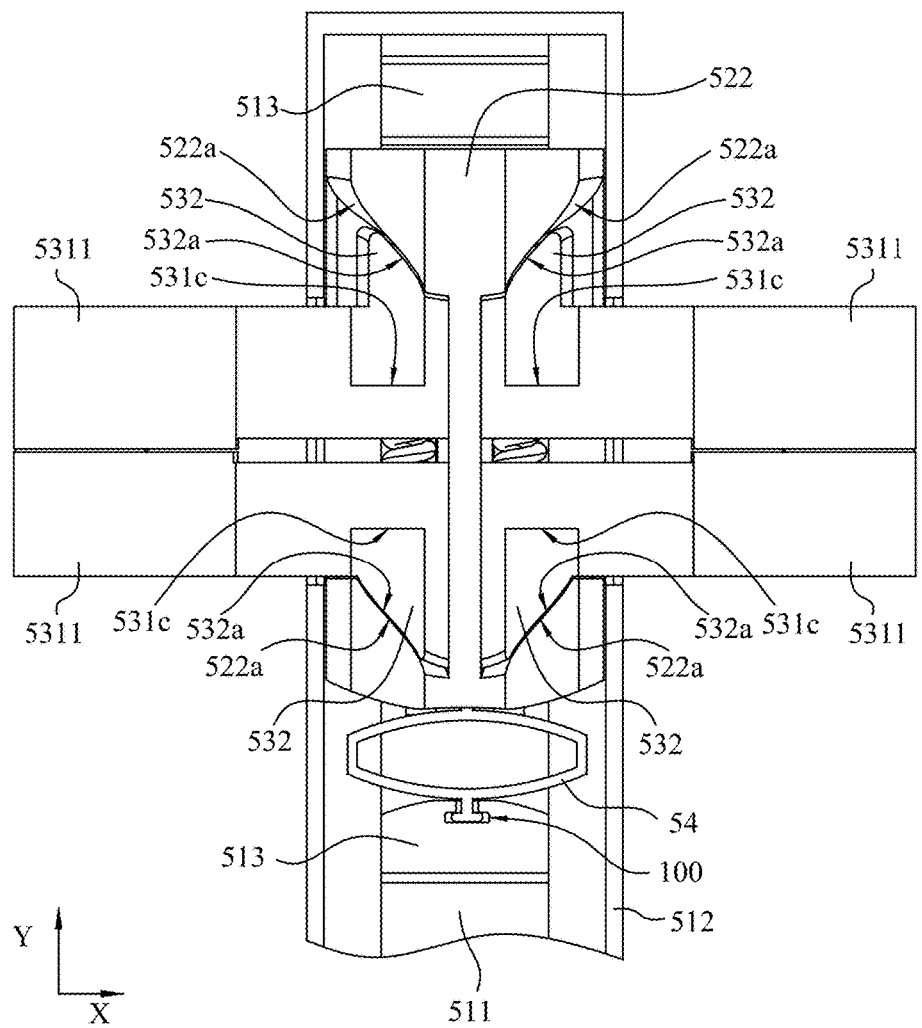
FIG. 8 is a schematic diagram of a partial structure of a hinge apparatus according to an embodiment of this application.

FIG. 7 schematically shows a partial structure of a hinge apparatus 50 according to this application. The limiting guide track 521 shown in FIG. 5 is removed in the structure shown in FIG. 7. FIG. 8 schematically shows a partial structure of a hinge apparatus 50 according to this application. Refer to FIG. 5 to FIG. 8. The hinge apparatus 50 further includes swing arm assemblies 53. The swing arm assemblies 53 each include swing arm bodies 531 and second adapter parts 532. The swing arm bodies 531 are connected to the frames 40. For example, the swing arm bodies 531 are detachably connected to the frames 40. Each swing arm body 531 includes a connection end 531a and a free end 531b. The connection end 531a of the swing arm body 531 is close to the base 52, and the free end 531b of the swing arm body 531 is away from the base 52. The free ends 531b of the swing arm bodies 531 may be configured to be connected to the frames 40. At least part of the connection end 531a is located in the relief space 52a of the base 52. The second adapter parts 532 are connected to the connection ends 531a of the swing arm bodies 531. The second adapter parts 532 are rotatably connected to the first adapter parts 52b. For example, the second adapter part 532 is located at a side of the swing arm body 531 in a movement direction of the synchronous slider 522. A rotation axis of the second adapter part 532 extends in the length direction Y of the shaft cover 51. The second adapter parts 532 are connected to the synchronous slider 522.

The swing arm bodies 531 rotate relative to the first adapter parts 52b via the second adapter parts 532, to switch between a folded position and an unfolded position. When the swing arm bodies 531 rotate relative to the base 52, the relief spaces 52a of the base 52 may accommodate the swing arm bodies 531, to avoid positional interference between the base 52 and the swing arm bodies 531. When the swing arm bodies 531 are connected to the frames 40, the swing arm bodies 531 may flip synchronously with the frames 40, so that the frames 40 may rotate relative to the hinge apparatus 50 to be folded. In addition, when the second adapter parts 532 rotate relative to the first adapter parts 52b, the second adapter parts 532 synchronously drive the synchronous slider 522 to move between a first position and a second position. When the swing arm bodies 531 are at the folded position, the synchronous slider 522 is in the first position. When the swing arm bodies 531 are at the unfolded position, the synchronous slider 522 is in the second position.

The synchronous slider 522 can realize movement synchronization of the swing arm assemblies 53 on two sides of the shaft cover 51, to ensure movement synchronization of the frames 40 on the two sides of the shaft cover 51, so that consistence of rotation angles of the frames 40 on the two sides during folding and unfolding are ensured, thereby facilitating improvement of stability and smoothness of the flexible display screen 30 during folding or unfolding, and improving convenience as well as experience and satisfaction during use of the electronic device 10.

In the hinge apparatus 50 according to an embodiment of this application, the shaft cover 51 can provide a mounting base for the bases 52 and the swing arm assemblies 53. The shaft cover 51 can protect the bases 52 and the swing arm assemblies 53. Each base 52 includes the synchronous slider 522 and the limiting guide track 521. The synchronous slider 522 is slidable relative to the limiting guide track 521. The limiting guide track 521 can form a positional limitation on the synchronous slider 522. The base 52 further includes relief spaces 52a and first adapter parts 52b. Part of the swing arm body 531 of the swing arm assembly 53 is located in the relief space 52a, to facilitate increasing structural compactness of the hinge apparatus 50. The second adapter parts 532 of the swing arm assemblies 53 are rotatably connected to the first adapter parts 52b of the bases 52. The second adapter parts 532 are connected to the synchronous slider 522. When the swing arm bodies 531 and the second adapter parts 532 rotate relative to the first adapter parts 52b, the second adapter parts 532 synchronously drive the synchronous slider 522 to move relative to the limiting guide track 521, so that synchronization between a flipping process of the swing arm bodies 531 and a movement process of the synchronous slider 522 may be achieved, and the synchronous slider 522 can achieve synchronization of flipping movements of the swing arm bodies 531 on two sides of the shaft cover 51, to ensure that the frames 40 connected to the swing arm bodies 531 can rotate synchronously, thereby facilitating improvement of convenience as well as experience and satisfaction during use of the electronic device 10.

In some possible implementations, the hinge apparatus 50 includes two bases 52. The two bases 52 are spaced apart in the length direction Y of the shaft cover 51. The bases 52 may be disposed close to end parts of the shaft cover 51. Two swing arm assemblies 53 may be connected to one base 52, and the two swing arm assemblies 53 are spaced apart in the width direction X of the shaft cover 51. Under limitation of the synchronous slider 522, the two swing arm assemblies 53 may flip synchronously. The second adapter parts 532 of the two swing arm assemblies 53 may synchronously drive the synchronous slider 522 to move. When the swing arm bodies 531 are in the folded position, the free ends 531b of the two swing arm bodies 531 are close to each other. When the swing arm bodies 531 are in the unfolded position, the free ends 531b of the two swing arm bodies 531 are away from each other. In some examples, one frame 40 may be connected to the two swing arm assemblies 53.

Figure 9:
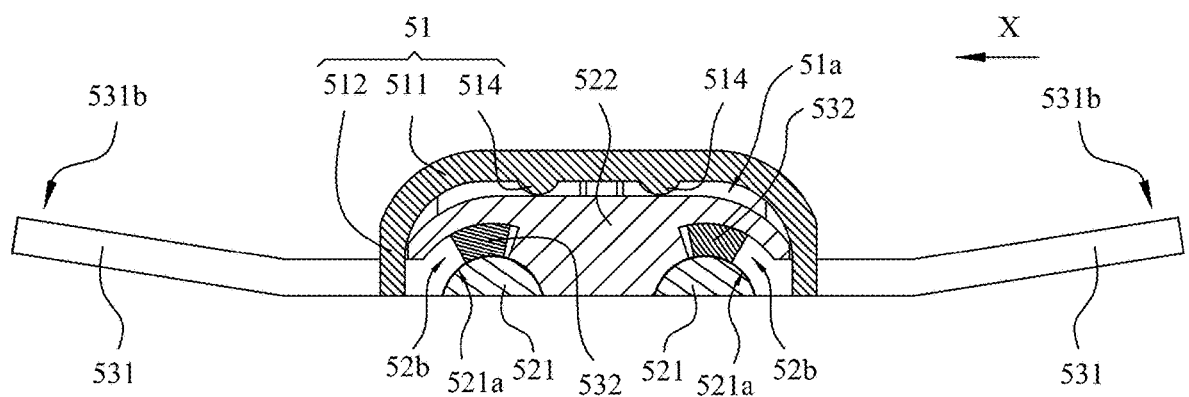
FIG. 9 is a schematic diagram of a cross-sectional structure obtained by cutting in a M-M direction in FIG. 5.

In some other possible implementations, FIG. 9 schematically shows a cross-sectional structure obtained by cutting in a W-W direction in FIG. 5. Refer to FIG. 5 to FIG. 9. The first adapter parts 52b are arc slide ways. The first adapter parts 52b are circular-arc-shaped. An axial direction of the first adapter part 52b is the same as the length direction Y of the shaft cover 51. In addition, the axial direction of the first adapter part 52b is the same as the movement direction of the synchronous slider 522. The first adapter parts 52b are communicated with the relief spaces 52a. The first adapter parts 52b may be observed from the relief spaces 52a. The second adapter parts 532 are arc structures. The second adapter parts 532 are circular-arc-shaped. An axial direction of the second adapter part 532 is the same as the length direction Y of the shaft cover 51. In addition, the axial direction of the second adapter part 532 is the same as the movement direction of the synchronous slider 522. The second adapter parts 532 are fitted to the first adapter parts 52b by insertion. At least part of the second adapter part 532 is located in the first adapter part 52b. An axis of the first adapter part 52b is coaxial with an axis of the second adapter part 532. A shape of the first adapter part 52b matches a shape of the second adapter part 532. When a rotation moment is applied to the second adapter part 532, the second adapter part 532 may rotate in the first adapter part 52b. When the second adapter part 532 rotates, part of the second adapter part 532 may rotate into or rotate out from the first adapter part 52b.

In some examples, when the swing arm bodies 531 are in an unfolded position, the second adapter parts 532 are entirely located in the first adapter parts 52b. Alternatively, most of the second adapter parts 532 are located in the first adapter parts 52b. The swing arm bodies 531 are in a folded position, most of the second adapter parts 532 are located outside the first adapter parts 52b.

The rotatable connection between the first adapter parts 52b of the bases 52 and the second adapter parts 532 of the swing arm assemblies 53 may be implemented without needing to provide additional connecting pieces to connect the first adapter parts 52b and the second adapter parts 532, thereby facilitating reduction of a quantity of parts used, and increasing structural compactness of the hinge apparatus 50. In addition, the insertion fitting between the first adapter parts 52b and the second adapter parts 532 in arc structures enables the bases 52 to form a positional limitation on the second adapter parts 532, to ensure smoothness of the first adapter parts 52b during rotation relative to the second adapter parts 532 and make the first adapter parts 52b and the second adapter parts 532 less likely to separate.

In some examples, the first adapter parts 52b and the second adapter parts 532 are disposed on two sides of the swing arm body 531 in the movement direction of the synchronous slider 522, so that the swing arm body 531 may be rotatably connected to the first adapter parts 52b of the bases 52 via the second adapter parts 532 on the two sides, thereby facilitating improvement of stress equalization of the swing arm body 531, and ensuring smooth rotation of the swing arm body 531.

The synchronous slider 522 may include first helical surfaces 522a. The first helical surfaces 522a are arranged corresponding to the first adapter parts 52b. The first helical surfaces 522a may be observed via the first adapter parts 52b in the movement direction of the synchronous slider 522. Each first helical surface 522a is located at a side that is of the first adapter part 52b and that faces away from the relief space 52a. The second adapter part 532 includes second helical surfaces 532a. A top surface that is of the second adapter part 532 and that faces away from the swing arm body 531 may be the second helical surface 532a. The first helical surfaces 522a are in contact with the second helical surfaces 532a, so that the second adapter parts 532 may transmit driving force to the synchronous slider 522 in contact regions between the first helical surfaces 522a and the second helical surfaces 532a. Helix directions of the first helical surfaces 522a on the two sides of the swing arm body 531 are identical to the movement direction of the synchronous slider 522, and helix directions of the second helical surfaces 532a on the two sides of the swing arm body 531 are identical. When the second adapter parts 532 rotate relative to the first adapter parts 52b, the first helical surfaces 522a and the second helical surfaces 532a slide relative to each other synchronously, to enable the second adapter parts 532 to drive the synchronous slider 522 to move.

When the swing arm body 531 switches between an unfolded position and a folded position, the first helical surfaces 522a and the second helical surfaces 532a on two sides of the swing arm body 531 remain in a close contact state. The second adapter part 532 on one side of the swing arm body 531 pushes the synchronous slider 522, the second adapter part 532 on the other side of the swing arm body 531 releases the synchronous slider 522, to realize movement of the synchronous slider 522, and ensure synchronization between a rotating process of the swing arm body 531 and a movement process of the synchronous slider 522.

Transmission between the synchronous slider 522 and the swing arm assemblies 53 achieved via the first helical surfaces 552a and the second helical surfaces 532a facilitates lowering possibility of the synchronous slider 522 and the swing arm assembly 53 getting stuck, ensure smooth rotation of the swing arm assemblies 53, and facilitates ensuring synchronization in rotation of the two swing arm assemblies 53 on the two side of the synchronous slider 522. When a rotation moment is applied to one of the two swing arm assemblies 53 that are connected to a same synchronous slider 522, the stressed swing arm assembly 53 is not easy to rotate, while when a rotation moment is applied to both the two swing arm assemblies 53, the two swing arm assemblies 53 may synchronously rotate relative to the synchronous slider 522.

In some examples, the two swing arm assemblies 53 are connected to the bases 52. The two swing arm assemblies 53 are spaced apart in the width direction X of the shaft cover 51. A helix direction of the first helical surface 522a corresponding to one swing arm assembly 53 is opposite to a helix direction of the first helical surface 522a corresponding to the other swing arm assembly 53. Correspondingly, a helix direction of the second helical surface 532a corresponding to one swing arm assembly 53 is opposite to a helix direction of the second helical surface 532a corresponding to the other swing arm assembly 53.

In some examples, when the synchronous slider 522 is in the first position, the swing arm bodies 531 are in the folded position. When the synchronous slider 522 is in the second position, the swing arm bodies 531 are in the unfolded position. When the swing arm bodies 531 rotate from the folded position to the unfolded position, the synchronous slider 522 moves toward the end part of the shaft cover 51, so that the synchronous slider 522 moves from the first position to the second position. When the swing arm bodies 531 rotate from the unfolded position to the folded position, the synchronous slider 522 moves away from the end part of the shaft cover 51, so that the synchronous slider 522 moves from the second position to the first position.

Figure 10:
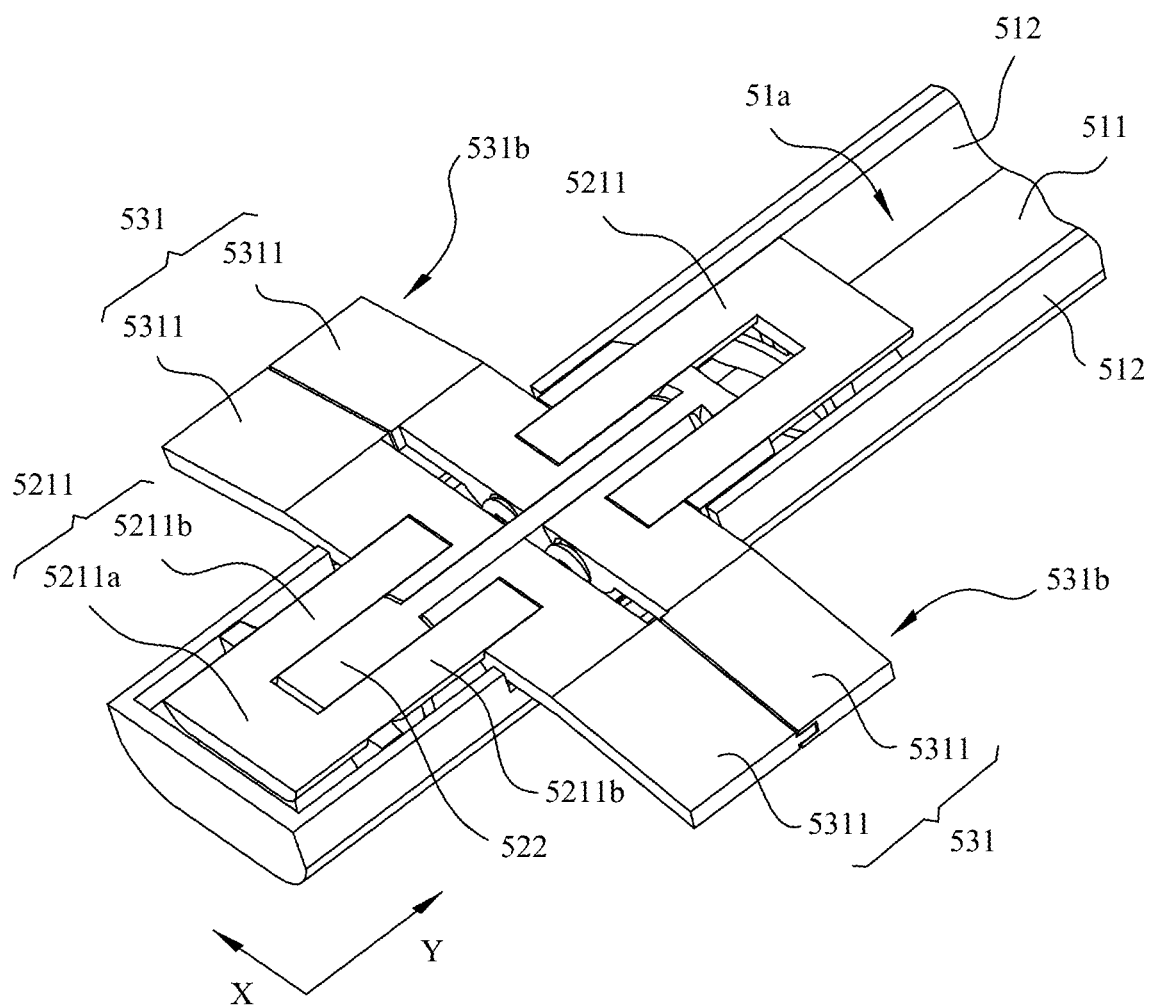
FIG. 10 is a schematic diagram of a partial structure of a hinge apparatus with swing arm bodies at an unfolded position according to an embodiment of this application.
Figure 11:
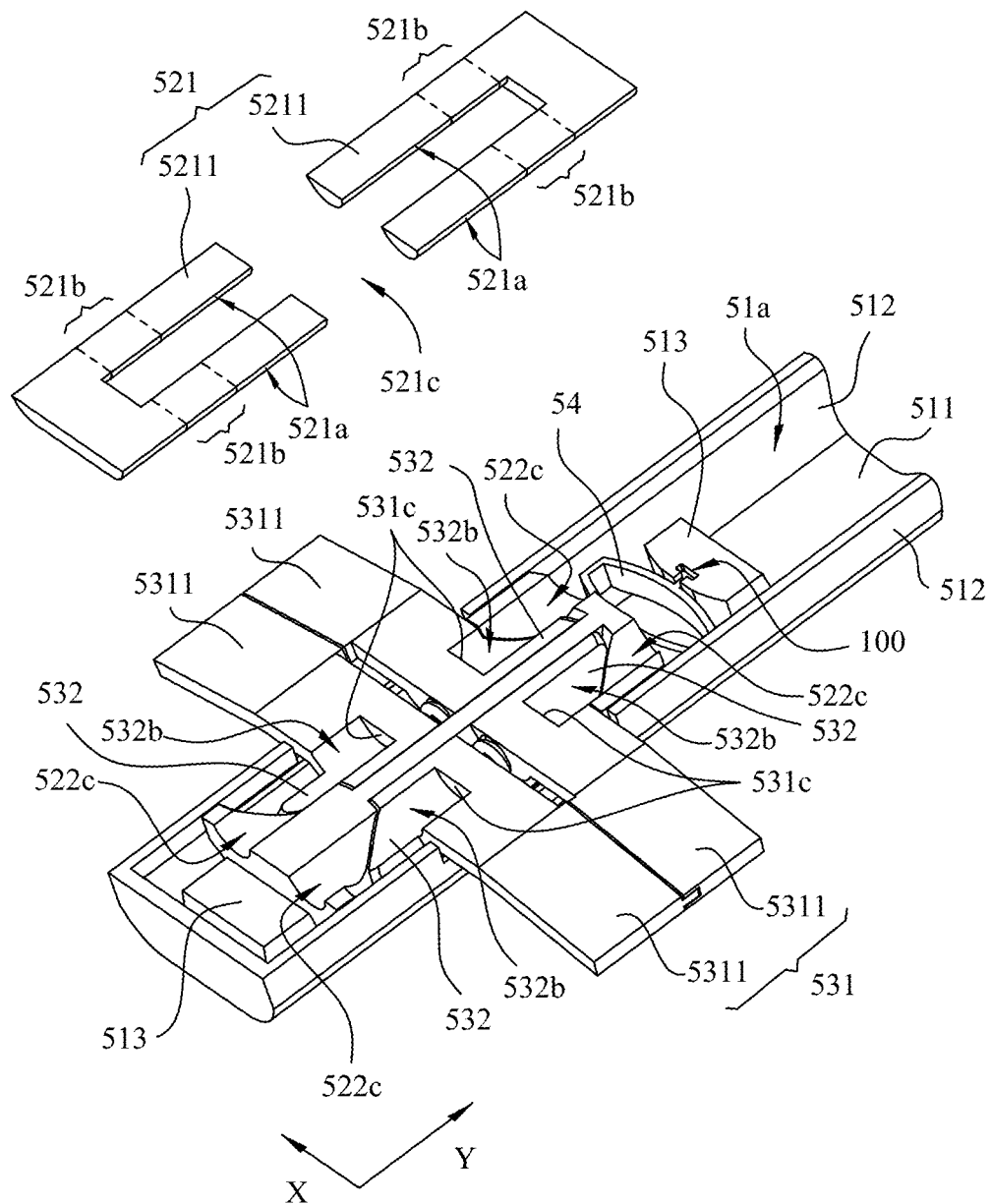
FIG. 11 is a schematic explosive view of a partial structure of a hinge apparatus according to an embodiment of this application.
Figure 12:
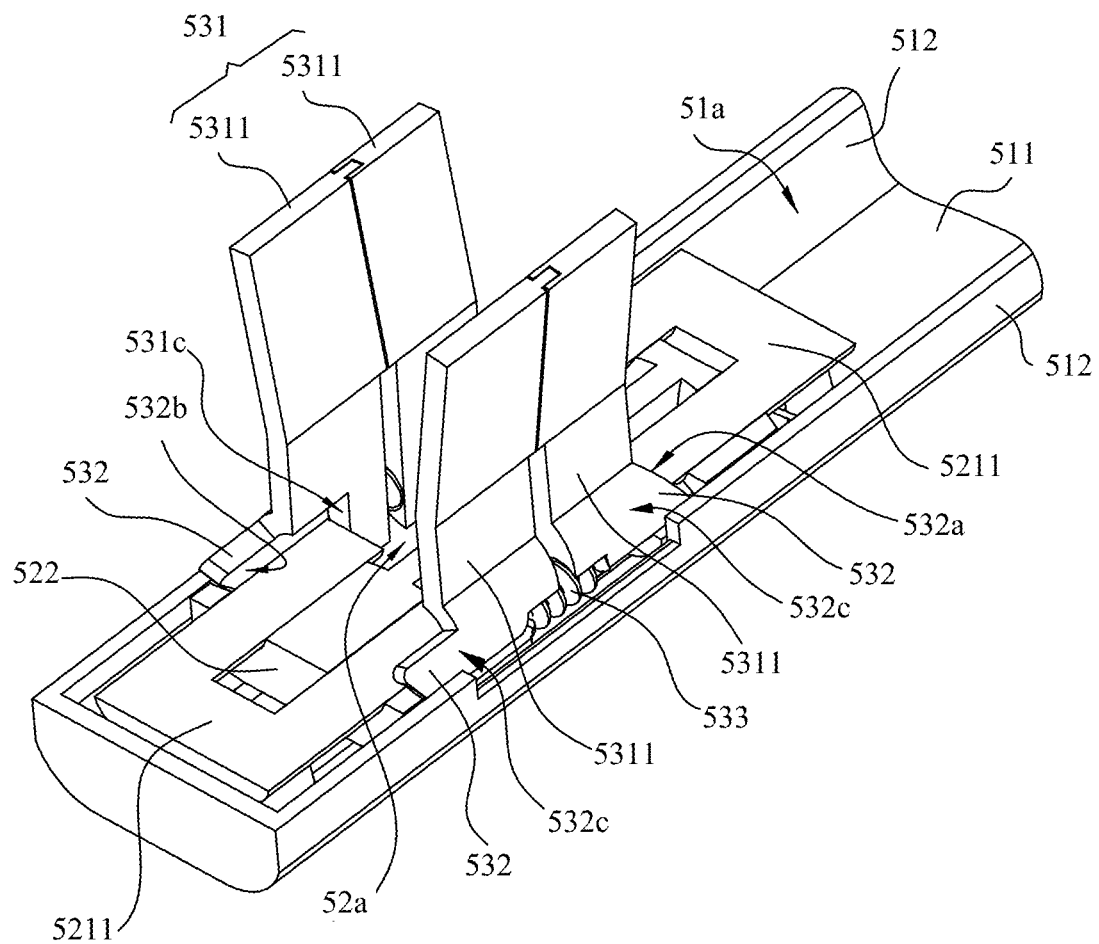
FIG. 12 is a schematic diagram of a partial structure of a hinge apparatus with swing arm bodies at a folded position according to an embodiment of this application.

In some examples, FIG. 10 schematically shows a partial structure of a hinge apparatus 50 with swing arm bodies 531 at an unfolded position according to this application. FIG. 11 is a schematic explosive view of a partial structure of a hinge apparatus 50 according to this application. FIG. 12 schematically shows a partial structure of a hinge apparatus 50 with swing arm bodies 531 at a folded position according to this application. Refer to FIG. 9 to FIG. 12. The limiting guide track 521 includes first arc surfaces 521a. The synchronous slider 522 includes second arc surfaces 522b. An axis corresponding to each first arc surface 521a may coincide with an axis corresponding to each second arc surface 522b. There is spacing between the first arc surface 521a and the second arc surface 522b. Arc slide ways are formed between the first arc surfaces 521a of the limiting guide track 521 and the second arc surfaces 522b of the synchronous slider 522. The second adapter parts 532 include third arc surfaces 532b and fourth arc surfaces 532c. An axis corresponding to each third arc surface 532b may coincide with an axis corresponding to each fourth arc surface 532c. After the second adapter parts 532 of the swing arm assemblies 53 are fitted to the bases 52, the first arc surfaces 521a of the limiting guide track 521 are in contact with the third arc surfaces 532b of the second adapter parts 532, and the second arc surfaces 522b of the limiting guide track 521 are in contact with the fourth arc surfaces 532c of the second adapter parts 532, so that looseness or shake of the second adapter parts 532 and the bases 52 is less likely to occur, thereby ensuring smoothness of the second adapter parts 532 during rotation relative to the bases 52. The first helical surfaces 522a on the synchronous slider 522 are connected to the second arc surfaces 522b. The second helical surfaces 532a on the second adapter parts 532 connect the third arc surfaces 532b to the fourth arc surfaces 532c.

For example, recess spaces are provided on the synchronous slider 522. A bottom surface that is of each recess space and that faces the limiting guide track 521 is the second arc surface 522b, and the limiting guide track 521 has the first arc surfaces 521a facing the recess spaces. After the limiting guide track 521 is fitted to the synchronous slider 522, the first adapter parts 52b are formed between the first arc surfaces 521a and the second arc surfaces 522b.

Figure 13:
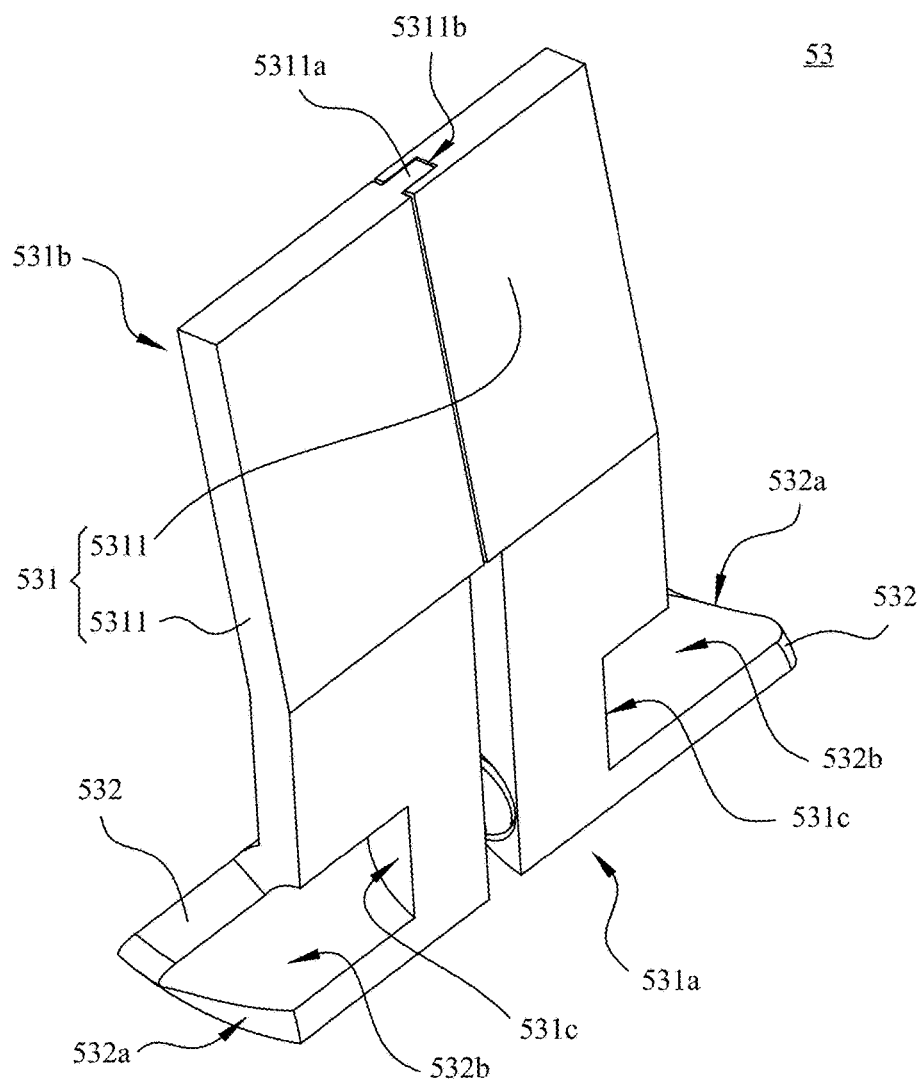
FIG. 13 is a schematic diagram of a structure of a swing arm assembly according to an embodiment of this application.

In some examples, FIG. 13 schematically shows a structure of a swing arm assembly 53 according to this application. Refer to FIG. 12 and FIG. 13. The swing arm bodies 531 include limiting surfaces 531c facing the second adapter parts 532. At least part of the limiting surface 531c is located in a relief space 52a. A surface that is of the limiting guide track 521 and that faces the relief space 52a abuts against the limiting surface 531c in a movement direction of the synchronous slider 522, so that when the swing arm assembly 53 rotates relative to the base 52, the limiting guide track 521 may restrict movement of the swing arm assembly 53 in a length direction Y of the shaft cover 51. For example, the second adapter parts 532 includes the third arc surfaces 532b. The limiting surfaces 531c of the swing arm bodies 531 are connected to the third arc surfaces 532b of the second adapter parts 532.

Figure 14:
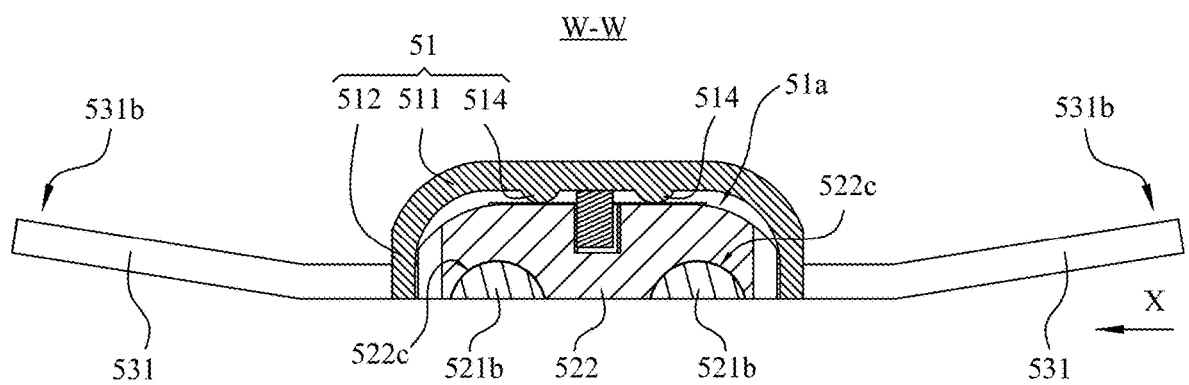
FIG. 14 is a schematic diagram of a cross-sectional structure obtained by cutting in a W-W direction in FIG. 5.
Figure 15:
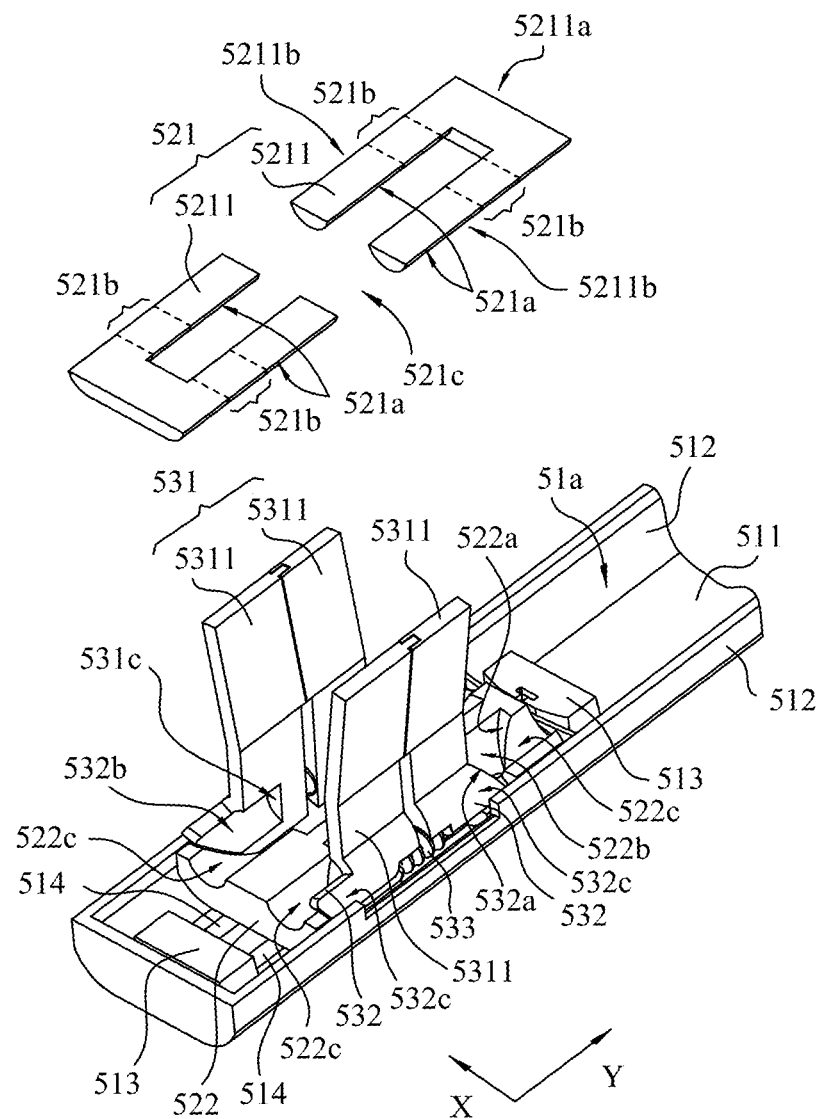
FIG. 15 is a schematic explosive view of a partial structure of a hinge apparatus according to an embodiment of this application.
Figure 16:
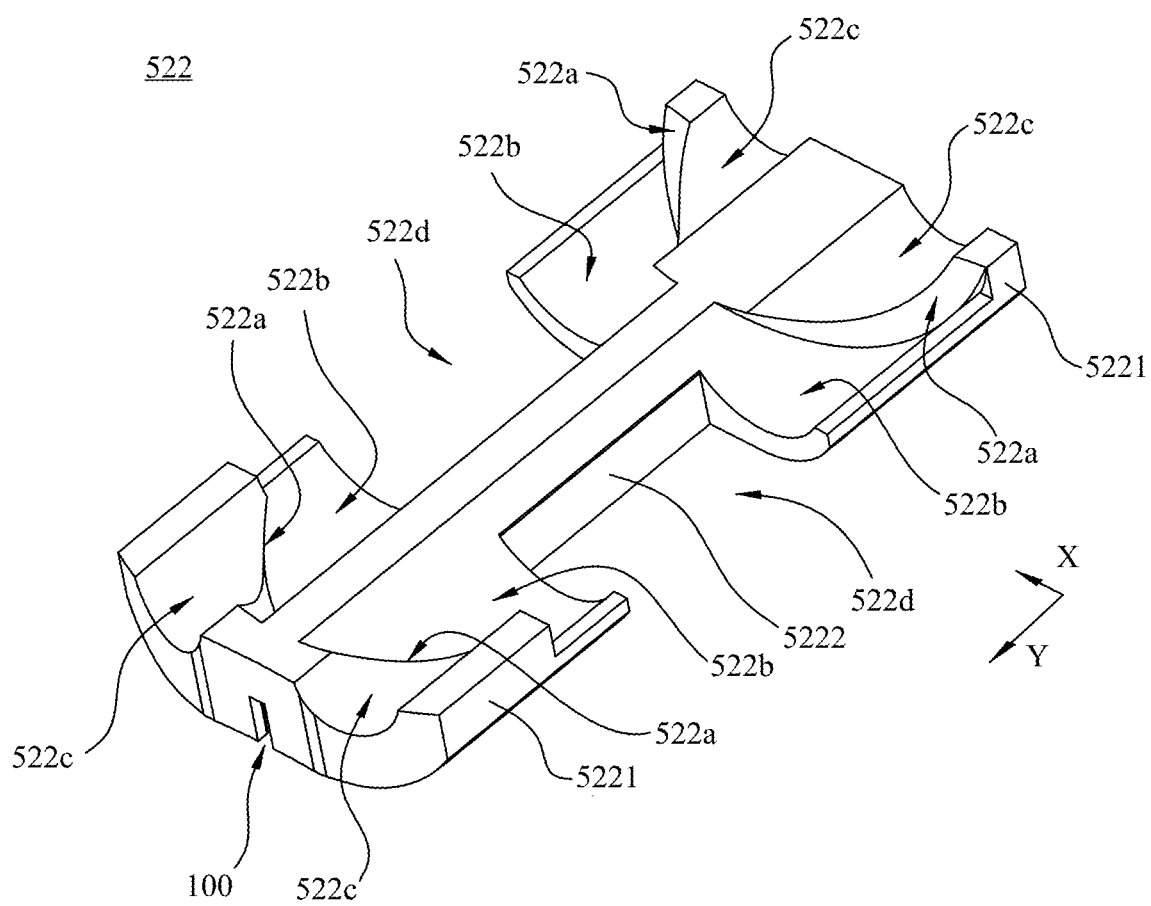
FIG. 16 is a schematic diagram of a structure of a synchronous slider according to an embodiment of this application.

In some examples, FIG. 14 schematically shows a cross-sectional structure obtained by cutting in a W-W direction in FIG. 5. FIG. 15 is a schematic explosive view of a partial structure of a hinge apparatus 50 according to this application. FIG. 16 schematically shows a structure of a synchronous slider 522 according to this application. Refer to FIG. 14 to FIG. 16. The synchronous slider 522 includes guide recesses 522c. An extension direction of the guide recess 522c is the same as a movement direction of the synchronous slider 522. The guide recesses 522c face a limiting guide track 521. The first adapter parts 52b are communicated with the guide recesses 522c. The guide recess 522c is disposed at a side that is of the first adapter part 52b and that faces away from a relief space 52a. The limiting guide track 521 includes guide parts 521b. The guide parts 521b are located in the guide recess 522c. A shape of the guide part 521b matches a shape of the guide recess 522c. The synchronous slider 522 is rotatably connected to the guide parts 521b. The guide parts 521b of the limiting guide track 521 can form a positional limitation on the synchronous slider 522, so that the synchronous slider 522 is less likely to deviate relative to the limiting guide track 521 during movement of the synchronous slider 522 in a length direction Y of a shaft cover 51. For example, the synchronous slider 522 is less likely to deviate in a width direction X of the shaft cover 51. The synchronous slider 522 includes two opposite end surfaces in the length direction Y of the shaft cover 51. The guide recesses 522*c* on the synchronous slider 522 may be configured to run through the end surfaces.

A quantity of the guide recesses 522*c* on the synchronous sliders 522 is two. Correspondingly, a quantity of the guide parts 521*b* on the limiting guide track 521 is two. The two guide recesses 522*c* are spaced apart and the two guide parts 521*b* are spaced apart in the width direction X of the shaft cover 51.

For example, an inner wall that is of the guide recess 522*c* and that faces the limiting guide track 521 may be an arc surface, and a surface that is of the guide part 521*b* and that faces the guide recess 522*c* may be an arc surface. The inner wall that is of the guide recess 522*c* and that faces the limiting guide track 521 is connected to a first helical surface 522*a*.

The surface that is of the guide part 521*b* and that faces the guide recess 522*c* may be flush with the first arc surface 521*a* of the limiting guide track 521, so that the surface that is of the guide part 521*b* and that faces the guide recess 522*c* may be smoothly transitioned to the first arc surface 521*a* of the limiting guide track 521.

For example, a surface that is of the limiting guide track 521 and that faces away from the shaft cover 51 is a plane. When the swing arm bodies 531 are at an unfolded position, a surface that is of the swing arm body 531 and that faces away from the shaft cover 51 may be flush with a surface that is of the limiting guide track 521 and that faces away from the shaft cover 51. This facilitates provision of support for a flexible display screen 30 by both the swing arm bodies 531 and the limiting guide track 521, thereby lowering possibility that part of the flexible display screen 30 lacks support due to a stepped structure formed between the swing arm bodies 531 and the limiting guide track 521.

For example, both the surface that is of the limiting guide track 521 and that faces away from the shaft cover 51 and a surface that is of the synchronous slider 522 and that faces away from the shaft cover 51 may be planar. The surface that is of the limiting guide track 521 and that faces away from the shaft cover 51 may be flush with the surface that is of the synchronous slider 522 and that faces away from the shaft cover 51. When the swing arm bodies 531 are at the unfolded position, the surface that is of the swing arm body 531 and that faces away from the shaft cover 51, the surface that is of the limiting guide track 521 and that faces away from the shaft cover 51, and the surface that is of the synchronous slider 522 and that faces away from the shaft cover 51 may be all flush with each other.

In some possible implementations, the limiting guide track 521 includes two limiting guide members 5211. The two limiting guide members 5211 are respectively connected to the shaft cover 51. The two limiting guide members 5211 are spaced apart in the movement direction of the synchronous slider 522. A first relief part 521*c* is formed between the two limiting guide members 5211. The synchronous slider 522 includes end connection parts 5221 and an intermediate connection part 5222. A quantity of the end connection parts 5221 is two. The two end connection parts 5221 are spaced apart in the movement direction of the synchronous slider 522. The intermediate connection part 5222 connects the two end connection parts 5221. The synchronous slider 522 includes second relief parts 522*d* located on two sides of the intermediate connection part 5222. A width of the intermediate connection part 5222 is less than a width of the end connection part 5221 in the width direction X of the shaft cover 51. The intermediate connection part 5222 is connected to middle regions of the end connection parts 5221, so that the second relief parts 522*d* are formed between the end connection parts 5221 and the intermediate connection part 5222. The first relief part 521*c* is located at a side that is of the second relief part 522*d* and that faces away from the shaft cover 51. The first relief part 521*c* is communicated with the second relief parts 522*d*. The first relief part 521*c* and the second relief parts 522*d* form relief spaces 52*a*. One limiting guide member 5211 is disposed corresponding to one end connection part 5221. The end connection parts 5221 are rotatably connected to the corresponding limiting guide members 5211. The first adapter parts 52*b* are disposed between the end connection parts 5221 and the limiting guide members 5211. The first adapter parts 52*b* are arc slide ways. The first adapter parts 52*b* are communicated with the second relief parts 522*d*.

For example, the second arc surfaces 522*b* and the first helical surfaces 522*a* are disposed on the end connection parts 5221. The end connection parts 5221 are provided with guide recesses 522*c*. Each end connection part 5221 is provided with two guide recesses 522*c*, and each limiting guide member 5211 is provided with two guide parts 521*b*.

For example, the swing arm bodies 531 include limiting surfaces 531*c* facing the second adapter parts 532. At least part of the limiting surface 531*c* is located in the first relief part 521*c*. A surface that is of the limiting guide member 5211 and that faces the first relief part 521*c* abuts against the limiting surface 531*c* of the swing arm body 531 in the length direction Y of the shaft cover 51, so that when the swing arm assemblies 53 rotates relative to the base 52, the two limiting guide members 5211 may restrict movement of the swing arm assemblies 53 in the length direction Y of the shaft cover 51.

In some examples, refer to FIG. 15, each limiting guide member 5221 include a fixed part 5211*a* and two connecting support legs 5211*b*. The fixed part 5211*a* is connected to the two connecting support legs 5211*b*. The two connecting support legs 5211*b* are spaced apart in the width direction X of the shaft cover 51. The intermediate connection part 5222 of the synchronous slider 522 is disposed corresponding to a space between the two connecting support legs 5211*b*. The fixed parts 5211*a* of the limiting guide members 5211 is connected to the shaft cover 51. The end connection parts 5221 are rotatably connected to corresponding connecting support legs 5211*b*. The first adapter parts 52*b* are provided between the end connection parts 5221 and the connecting support legs 5211*b*. The second adapter parts 532 of the swing arm assemblies 53 are located between the end connection parts 5221 and the connecting support legs 5211*b*.

For example, the two connecting support legs 5211*b* of the limiting guide member 5211 are located at a same side of the fixed part 5211*a* in the length direction Y of the shaft cover 51. Two limiting guide members 5211 in the base 52, connecting support legs 5211*b* of one limiting guide member 5211 face connecting support legs 5211*b* of another limiting guide member 5211. The first relief part 521*c* is formed between the connecting support legs 5211*b* of one limiting guide member 5211 and the connecting support legs 5211*b* of another limiting guide member 5211.

For example, the first arc surfaces 521*a* are provided on the connecting support legs 5211*b* of the limiting guide members 5211, and the second arc surfaces 522*b* and the first helical surfaces 522*a* are provided on the end connection parts 5221.

For example, the end connection part 5221 may be provided with guide recesses 522c. Guide parts 521b are provided on the connecting support legs 5211b of the limiting guide members 5211.

For example, a length of the end connection part 5221 is less than a length of the connecting support leg 5211b in the length direction Y of the shaft cover 51.

In some examples, refer to FIG. 15, the shaft cover 51 includes a bottom plate 511, side plates 512, and support bosses 513. The bottom plate 511 and the side plates 512 form accommodation recess parts 51a. The base 52 is disposed between the two side plates 512 in the width direction X of the shaft cover 51. A limiting guide track 521 of the base 52 is disposed at a side that is of the synchronous slider 522 and that faces away from the bottom plate 511. The support bosses 513 are disposed on the bottom plate 511. The fixed part 5211a of the limiting guide member 5211 is located at a side that is of the support boss 513 and that faces away from the bottom plate 511. The fixed part 5211a is connected to the support boss 513. The two support bosses 513 are spaced apart in a movement direction of the synchronous slider 522. The synchronous slider 522 is disposed between the two support bosses 513.

For example, the fixed parts 5211a of the limiting guide members 5211 are detachably connected to the support bosses 513. For example, the fixed parts 5211a may be connected to the support bosses 513 by using screws.

The synchronous slider 522 according to an embodiment of this application is slidably connected to the shaft cover 51, so that the synchronous slider 522 is slidably connected to the limiting guide track 521, and the synchronous slider 522 is slidably connected to the shaft cover 51, to positionally limit the synchronous slider 522 by the limiting guide track 521 and the shaft cover 51 together, thereby facilitating improvement of stability of the synchronous slider 522 during movement.

In some possible implementations, as shown in FIG. 14 and FIG. 15, the shaft cover 51 may include ribs 514. The ribs 514 are located at a side that is of the synchronous slider 522 and that faces away from the limiting guide track 521. The ribs 514 abut against a surface that is of the synchronous slider 522 and that faces away from the limiting guide track 521. The synchronous slider 522 is slidably fitted to the ribs 514. The limiting guide track 521 and the ribs 514 abut against two sides of the synchronous slider 522.

In some examples, a quantity of the ribs 514 may be two. The two ribs 514 are spaced apart in the width direction X of the shaft cover 51. A surface that is of the rib 514 and that faces the synchronous slider 522 may be an arc surface, to facilitate reduction of a contact area between the rib 514 and the synchronous slider 522, thereby reducing frictional resistance.

In some examples, the shaft cover 51 includes the bottom plate 511 and the side plates 512. The bottom plate 511 and the side plates 512 form accommodation recess parts 51a. The ribs 514 are disposed on the bottom plate 511. The limiting guide track 521 is located at a side that is of the synchronous slider 522 and that faces away from the bottom plate 511. For example, there may be spacing between the synchronous slider 522 and the side plates 512, to reduce possibility of generating frictional resistance due to contact between the synchronous slider 522 and the side plates 512. For example, the side plates 512 are each provided with a relief notch. When the swing arm body 531 is at an unfolded position, the relief notches may accommodate the swing arm bodies 531. At each relief notch, a surface that is of the swing arm body 531 and that faces away from the shaft cover 51 may be flush with a top surface that is of the side plate 512 and that faces away from the bottom plate 511. For example, the top surface that is of the side plate 512 and that faces away from the bottom plate 511, the surface that is of the synchronous slider 522 and that faces away from the bottom plate 511, and a surface that is of the limiting guide member 5211 and that faces away from the bottom plate 511 may all be flush with each other.

Figure 17:
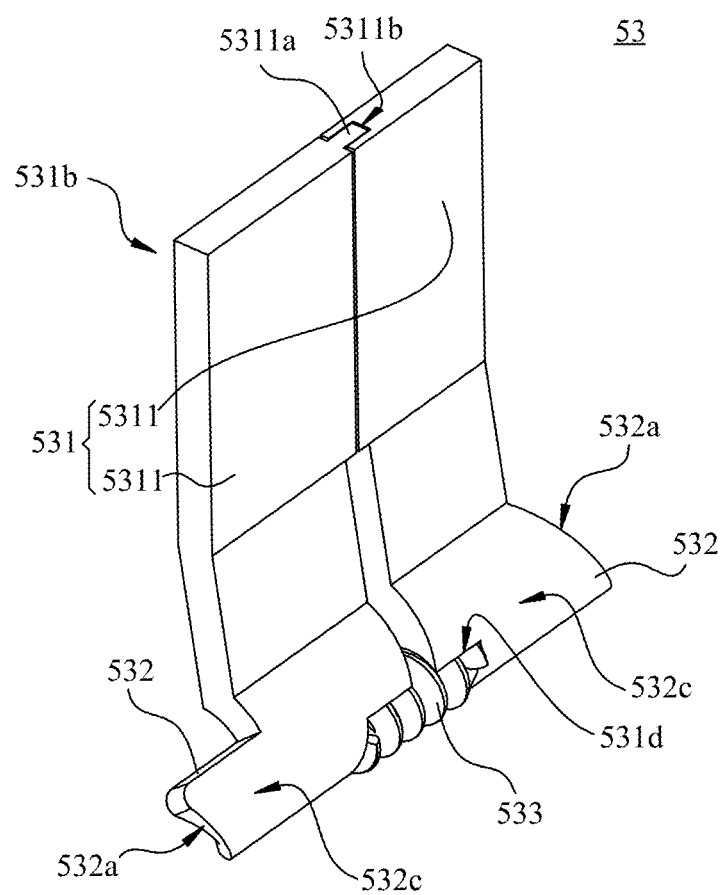
FIG. 17 is a schematic diagram of a structure of a swing arm assembly according to an embodiment of this application.
Figure 18:
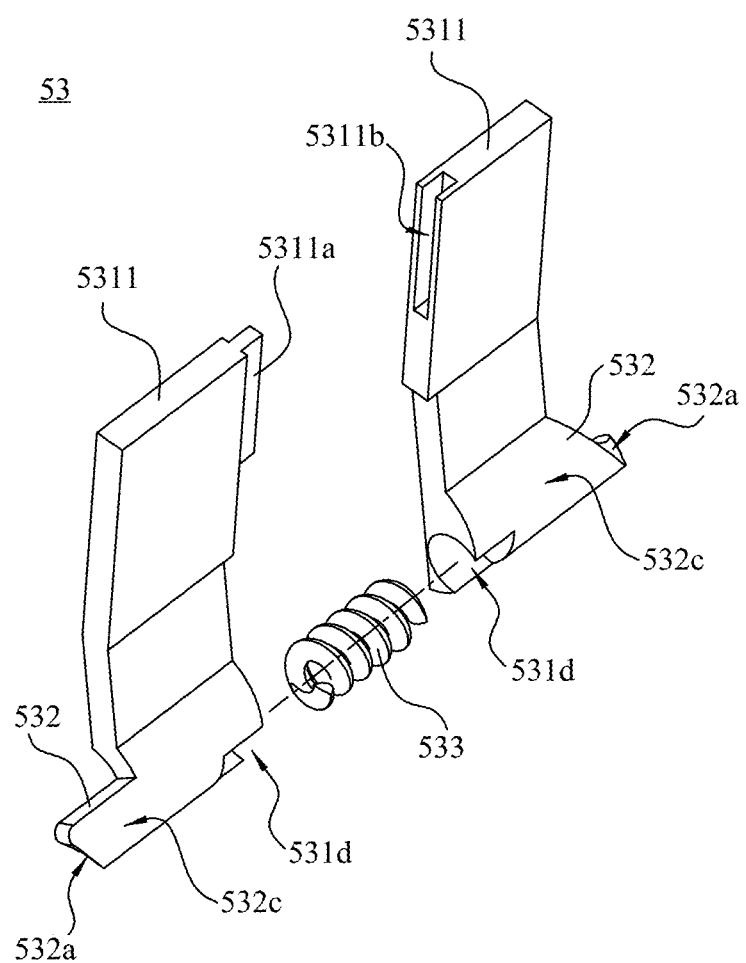
FIG. 18 is a schematic explosive view of a structure of a swing arm assembly according to an embodiment of this application.

In some examples, FIG. 17 schematically shows a structure of a swing arm assembly 53 according to this application. FIG. 18 schematically shows an exploded structure of a swing arm assembly 53 according to this application. Refer to FIG. 17 and FIG. 18. Each swing arm body 531 includes two connecting arms 5311. The two connecting arms 5311 are disposed side by side in a movement direction of the synchronous slider 522. The two connecting arms 5311 are slidably connected to each other. The swing arm assembly 53 further includes elastic members 533. Each elastic member 533 is disposed between the two connecting arms 5311. A second adapter part 532 may be correspondingly provided on a side of each connecting arm 5311. The elastic members 533 are disposed corresponding to the second adapter parts 532. Each elastic member 533 can provide force for the two connecting arms 5311, so that after the swing arm assemblies 53 are fitted to the base 52, a close contact state between the first helical surfaces 522a of the synchronous slider 522 and the second helical surfaces 532a of the second adapter parts 532 may be maintained stably, to reduce possibility of gaps between the first helical surfaces 522a and the second helical surfaces 532a, thereby effectively ensuring rotation synchronization of the swing arm assemblies 53.

For example, an accommodation space 531d is formed between the two connecting arms 5311, and the elastic member 533 is disposed in the accommodation space 531d. The elastic member 533 may be a helical spring. An axis of the elastic member 533 may coincide with an axis of the second adapter part 532. For example, after the two connecting arms 5311 are fitted to the base 52, the elastic members 533 may be in a compressed state.

In some examples, one of the connecting support arms 5311 includes an insertion block 5311a, the other connecting support arm 5311 includes an insertion slot 5311b. The insertion block 5311a is inserted into the insertion slot 5311b in a movement direction of the synchronous slider 522. The two connecting arms 5311 are slidably connected to each other via the insertion block 5311a and the insertion slot 5311b, and the two connecting arms 5311 may transmit force through the insertion block 5311a, to ensure that the two connecting arms 5311 maintain rotation synchronization.

In some examples, the connecting arm 5311 and the second adapter part 532 connected to the connecting arm 5311 are an integrally formed structure.

In some possible implementations, an assembly manner may be, but is not limited to, placing the synchronous slider 522 in the shaft cover 51. The synchronous slider 522 includes the first helical surfaces 522a and the second arc surfaces 522b. Then, the elastic member 533 is placed into the accommodation space 531d formed between the two connecting arms 5311. The two connecting arms 5311 of the swing arm assembly 53 are connected by insertion via the insertion block 5311a and the insertion slot 5311b. The second adapter parts 532 of the swing arm assembly 53 are placed on the synchronous slider 522, and fourth arc surfaces 532c of the second adapter parts 532 are in close contact with second arc surfaces 522b of the synchronous slider 522, and under an action of the elastic members 533, the second helical surfaces 532a of the second adapter parts 532 are in close contact with the first helical surfaces 522a of the synchronous slider 522. The limiting guide members 5211 are placed at a top of the synchronous slider 522. The first arc surfaces 521a on the connecting support legs 5211b of the limiting guide members 5211 are in close contact with the third arc surfaces 532b of the second adapter parts 532, and the guide parts 521b on the connecting support legs 5211b match the guide recesses 522c of the end connection parts 5221. The fixed parts 5211a of the limiting guide members 5211 are connected to the support bosses 513 of the shaft cover 51, to ensure that the second adapter parts 532 is compressed by the connecting support legs 5211b and the end connection parts 5221.

In some examples, the two connecting arms 5311 of the swing arm assembly 53 may be connected to frames 40. After the two connecting arms 5311 are connected to the frames 40, positions of the two connecting arms 5311 are relatively fixed, and do not change anymore.

Figure 19:
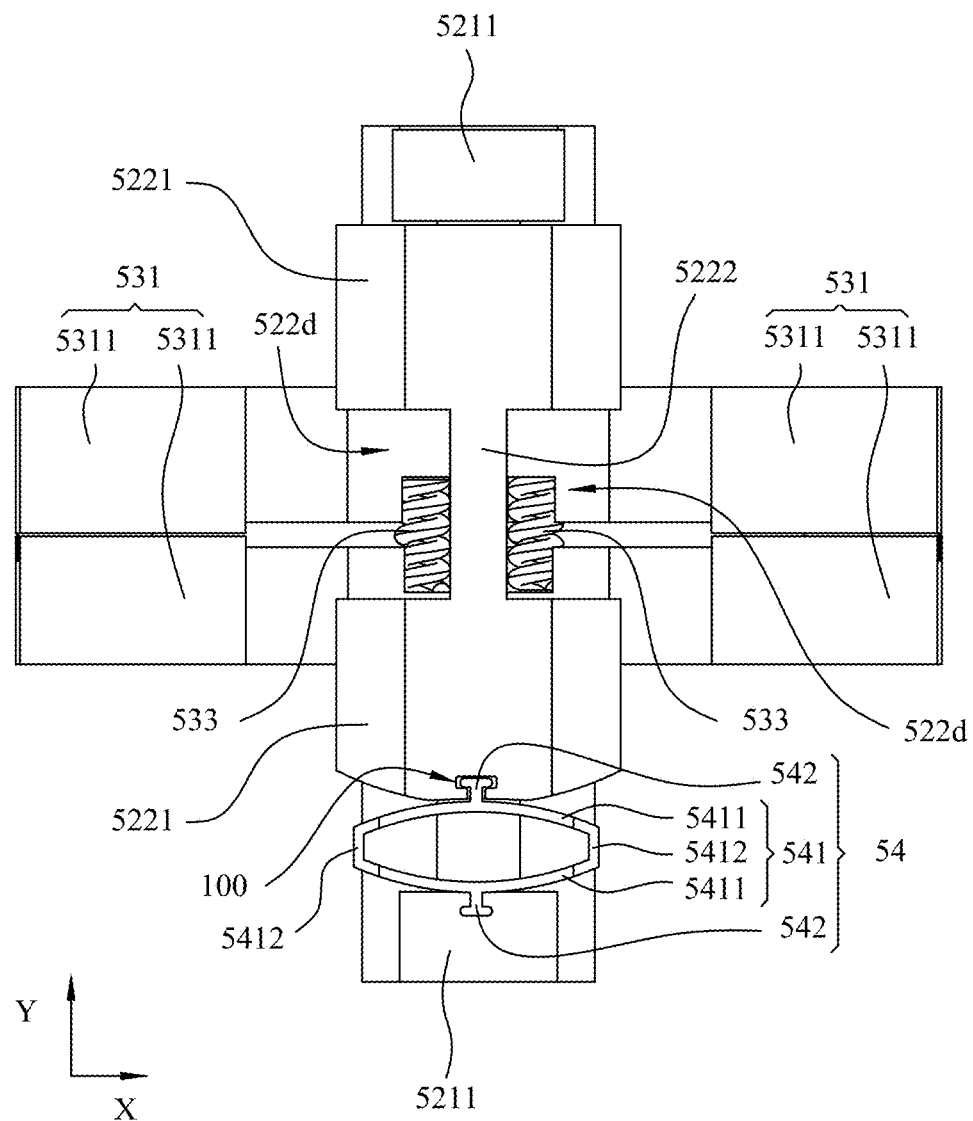
FIG. 19 is a schematic diagram of a partial structure of a hinge apparatus according to an embodiment of this application.
Figure 20:
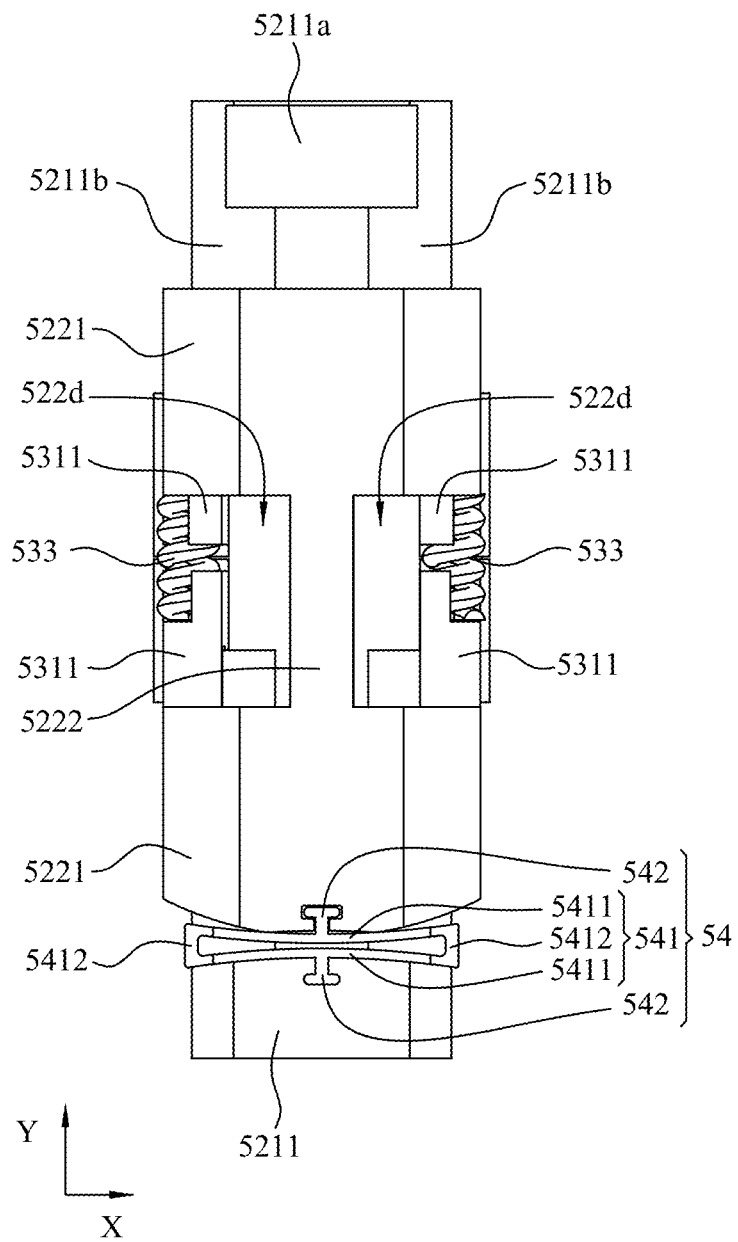
FIG. 20 is a schematic diagram of a partial structure of a hinge apparatus according to an embodiment of this application.

In some other possible implementations, FIG. 19 and FIG. 20 each schematically show a partial structure of a hinge apparatus 50 according to this application. Refer to FIG. 19 to FIG. 20. The hinge apparatus 50 further includes elastic damping members 54. The elastic damping member 54 is disposed on at least one side of the synchronous slider 522 in the movement direction of the synchronous slider 522.

The swing arm assemblies 53 rotates relative to the base 52, and during the swing arm assemblies 53 driving the synchronous slider 522 to move to switch between a first position and a second position, the synchronous slider 522 may cause the elastic damping members 54 to deform. Elastic force of the elastic damping member 54 may apply reaction force on the synchronous slider 522, to provide damping force, to enable the synchronous slider 522 to maintain a smooth and slow status during a movement process. In addition, force is transmitted through the synchronous slider 522, to increase rotate resistance of the swing arm assemblies 53, so that a large rotation moment needs to be applied to the swing arm assemblies 53 to drive the swing arm assemblies 53 to rotate, and the swing arm assemblies 53 may maintain a smooth and slow status during a rotating process. After the frames 40 are connected to the swing arm assemblies 53, the frames 40 may maintain a smooth and slow status during a rotating process, thereby facilitating improvement of a hand feel during folding or unfolding the frames 40.

In some examples, one end of each elastic damping member 54 is connected to the synchronous slider 522, the other end of the elastic damping member 54 is connected to the shaft cover 51 or the limiting guide track 521.

In some examples, the elastic damping member 54 is disposed on a side of an end part that is of the synchronous slider 522 and that faces away from the shaft cover 51.

In some examples, the synchronous slider 522 includes end connection parts 5221 and an intermediate connection part 5222. The elastic damping members 54 are connected to the end connection parts 5221.

In some examples, the synchronous slider 522 includes first helical surfaces 522a, and the second adapter parts 532 of the swing arm assembly 53 include second helical surfaces 532a. The elastic damping members 54 apply force on the synchronous slider 522. This may increase frictional resistance between the first helical surfaces 522a and the second helical surfaces 532a, thereby increasing rotation resistance of the swing arm assembly 53.

The elastic damping member 54 according to an embodiment of this application may include an annular body 541.

The annular body 541 includes elastic arms 5411 and support arms 5412. Two elastic arms 5411 are spaced apart in a movement direction of the synchronous slider 522. The support arms 5412 are connected to the two elastic arms 5411. The two support arms 5412 are spaced apart in a width direction X of the shaft cover 51. The elastic arms 5411 and the support arms 5412 are disposed alternately. One of the elastic arms 5411 is connected to the synchronous slider 522, and the other elastic arm 5411 is connected to at least one of the shaft cover 51 and the limiting guide track 521. During the synchronous slider 522 moving and switching between a first position and a second position, the synchronous slider 522 may cause the elastic arms 5411 to deform.

The elastic arm 5411 according to an embodiment of this application may be a plate-like structure. The support arm 5412 may be a plate-like structure.

In some examples, the elastic damping member 54 is disposed on a side of an end part that is of the synchronous slider 522 and that faces away from the shaft cover 51. During the synchronous slider 522 moving from the first position to the second position, the synchronous slider 522 may apply force on the elastic arms 5411, to cause the two elastic arms 5411 of the annular body 541 to move away from each other. During the synchronous slider 522 moving from the second position to the first position, the synchronous slider 522 may apply force on the elastic arms 5411, to cause the two elastic arms 5411 of the annular body 541 to move toward each other.

The elastic damping member 54 according to an embodiment of this application may further include connecting support arms 542. The elastic arms 5411 are connected to the connecting support arms 542. One of the connecting support arms 542 on the elastic arm 5411 is connected to the synchronous slider 522, and the other connecting support arm 542 on the elastic arm 5411 is connected to at least one of the shaft cover 51 and the limiting guide track 521.

The connecting support arm 542 may be disposed on the outer side of the elastic arm 5411. The connecting support arms 542 may be connected to middle regions of the elastic arms 5411 in a width direction of the shaft cover 51.

In some examples, the synchronous slider 522 may be provided with connecting holes 100, and the connecting support arms 542 may be inserted into connecting holes 100, to enable the synchronous slider 522 to be connected to the elastic damping members 54, thereby facilitating reduction of a quantity of parts used to implement connection between the synchronous slider 522 and the elastic damping members 54 and reduction of assembly complexity of the synchronous slider 522 and the elastic damping members 54.

In some examples, the connecting support arms 542 on the elastic arms 5411 are connected to the shaft cover 51. The shaft cover 51 may be provided with the connecting holes 100, and the connecting support arms 542 may be inserted into the connecting holes 100, to enable the shaft cover 51 to be connected to the elastic damping members 54, thereby facilitating reduction of a quantity of parts used to implement connection between the shaft cover 51 and the elastic damping members 54 and reduction of assembly complexity of the shaft cover 51 and the elastic damping members 54.

In some examples, the connecting support arms 542 of the elastic arms 5411 are connected to the limiting guide track 521. The limiting guide track 521 may be provided with connecting holes 100, and the connecting support arms 542 may be inserted into the connecting holes 100, to enable the limiting guide track 521 to be connected to the elastic damping members 54, thereby facilitating reduction of a quantity of parts used to implement connection between the limiting guide track 521 and the elastic damping members 54 and reduction of assembly complexity of the limiting guide track 521 and the elastic damping members 54. For example, the limiting guide track 521 includes limiting guide members 5211. The connecting support arms 542 may be connected to the fixed parts 5211a of the limiting guide members 5211.

In some examples, each connecting support arm 542 includes a first plate body and a second plate body. The first plate body intersects with the second plate body. The second plate body is connected to a middle region of the first plate body in the width direction X of the shaft cover 51. An end of the second plate body is connected to the first plate body, and another end of the second plate body is connected to the elastic arms 5411 of the annular body 541.

The elastic damping member 54 according to an embodiment of this application may be an integrally formed structure. In other words, the elastic arm 5411, the support arm 5412, and the connecting support arm 542 may be an integrally formed structure, so that the structure of the elastic damping member 54 is simple. The elastic damping members 54 may be connected to the synchronous slider 522 as a whole part, to reduce a quantity of parts of the hinge apparatus 50, increase structural compactness of the hinge apparatus 50, reduce space occupancy of the hinge apparatus 50, and facilitate reduction of assembly complexity of the elastic damping members 54 and the synchronous slider 522.

In descriptions of embodiments of this application, it should be noted that, unless specified or limited otherwise, the terms "mounting", "connected", and "connecting" should be understood broadly, for example, which may be a fixed connection, an indirect connection through an intermediary, or internal communication inside two components or an interaction relationship between two components. A person of ordinary skill in the art can understand specific meanings of the foregoing terms in embodiments of this application according to a specific situation.

In embodiments of this application, it is not implied that an apparatus or an element needs to have a particular orientation or needs to be constructed and operated in a particular orientation, and therefore cannot be construed as a limitation on embodiments of this application. In the descriptions of embodiments of this application, unless otherwise specifically limited, "a plurality of" means two or more than two.

The terms such as "first", "second", "third", and "fourth" (if any) in the specification and claims of embodiments of this application and in the accompanying drawings are used for distinguishing between similar objects and not necessarily used for describing any particular order or sequence. It is to be understood that data used in this way is exchangeable in a proper case, so that embodiments of this application described herein can be implemented in an order different from the order shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The term "more" in this specification refers to two or more than two. The term "and/or" used herein describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects. In a formula, the character "/" indicates a "division" relationship between the associated objects.

Understandably, various reference numerals in embodiments of this application are merely for differentiation for ease of description and are not intended to limit the scope of embodiments of this application. It should be understood that in embodiments of this application, an order of sequence numbers of the foregoing a process does not indicate an execution sequence, and execution sequences of processes should be determined according to functions and internal logics thereof and should not impose any limitation on an implementation process of embodiments of this application.

What is claimed is:

1. A hinge apparatus, comprising:

a shaft cover, comprising accommodation recess parts;

bases, disposed in the accommodation recess parts, wherein each base comprises relief spaces and first adapter parts, the first adapter parts face the relief spaces, the base comprises a synchronous slider and a limiting guide track, the limiting guide track is connected to the shaft cover, the limiting guide track is disposed at a side that is of the synchronous slider and that faces away from the shaft cover, and the synchronous slider is slidably connected to the limiting guide track; and swing arm assemblies, each comprising swing arm bodies and second adapter parts, wherein each swing arm body comprises a connection end and a free end, the connection end is close to the base, the free end is away from the base, at least part of the connection end is located in the relief space, the second adapter parts are connected to the connection ends, the second adapter parts are rotatably connected to the first adapter parts, the second adapter parts are connected to the synchronous slider, the swing arm bodies rotate relative to the first adapter parts via the second adapter parts to switch between a folded position and an unfolded position, and the second adapter parts synchronously drive the synchronous slider to move between a first position and a second position; and the synchronous slider comprises first helical surfaces, the first helical surfaces are arranged corresponding to the first adapter parts, each first helical surface is located at a side that is of the first adapter part and that faces away from the relief space, each second adapter part comprises a second helical surface, the first helical surfaces are in contact with the second helical surfaces, helix directions of the first helical surfaces on the two sides of the swing arm body are identical, helix directions of the second helical surfaces on the two sides of the swing arm body are identical, when the second adapter parts rotate opposite to the first adapter parts, the first helical surfaces and the second helical surfaces slide relative to each other synchronously, to enable the second adapter parts to drive the synchronous slider to move.

2. The hinge apparatus according to claim 1, wherein the first adapter parts are arc slide ways, an axial direction of the first adapter parts is the same as a movement direction of the synchronous slider, the first adapter parts are communicated with the relief spaces, the second adapter parts are arc structures, at least part of each second adapter part is located in the first adapter part, an axis of the first adapter part is coaxial with an axis of the second adapter part, and a shape of the first adapter part matches a shape of the second adapter part.

3. The hinge apparatus according to claim 2, wherein in the movement direction of the synchronous slider, each of two sides of the swing arm body is provided with the first adapter part and the second adapter part.

4. The hinge apparatus according to claim 3, wherein the limiting guide track comprises first arc surfaces, the synchronous slider comprises second arc surfaces, arc slide ways are formed between the first arc surfaces and the second arc surfaces, the second adapter parts comprises third arc surfaces and fourth arc surfaces, the first arc surfaces are in contact with the third arc surfaces, and the second arc surfaces are in contact with the fourth arc surfaces, the first helical surfaces are connected to the second arc surfaces, and the third arc surfaces and the fourth arc surfaces are connected by the second arc surfaces.

5. The hinge apparatus according to claim 4, wherein the synchronous slider comprises guide recesses, the guide recesses face the limiting guide track, the guide recesses are communicated with the first adapter parts, the limiting guide track comprises guide parts, the guide parts are located in the guide recesses, and shapes of the guide parts match shapes of the guide recesses.

6. The hinge apparatus according to claim 5, wherein an inner wall of each guide recess is arc-shaped, a surface that is of each guide part and that faces the guide recess is arc-shaped, and an axis of the guide recess is coaxial with an axis of the guide part.

7. The hinge apparatus according to claim 2, wherein the limiting guide track comprises two limiting guide members, the two limiting guide members are spaced apart in the movement direction of the synchronous slider to form a first relief part between the two limiting guide members, the synchronous slider comprises two end connection parts and an intermediate connection part, the two end connection parts are spaced apart in the movement direction of the synchronous slider, the intermediate connection part connects the two end connection parts, the synchronous slider comprises second relief parts located at two sides of the intermediate connection part, the first relief part and the second relief parts form the relief spaces, the end connection parts are slidably connected to the corresponding limiting guide members, and the first adapter parts are disposed between the end connection parts and the limiting guide members.

8. The hinge apparatus according to claim 7, wherein each limiting guide member comprises a fixed part and two connecting support legs, the fixed part connects the two connecting support legs, the fixed part is connected to the shaft cover, the end connection parts are slidably connected to the corresponding connecting support legs, and the first adapter parts are disposed between the end connection parts and the connecting support legs.

9. The hinge apparatus according to claim 8, wherein the shaft cover comprises a bottom plate, side plates, and support bosses, the bottom plate and the side plates form the accommodation recess parts, the support bosses are disposed on the bottom plate, the fixed parts are connected to the support bosses, the two support bosses are spaced apart in the movement direction of the synchronous slider, and the synchronous slider is disposed between the two support bosses.

10. The hinge apparatus according to claim 7, wherein each swing arm body comprises two connecting support arms, the two connecting support arms are arranged in parallel in the movement direction of the synchronous slider and are slidably connected to each other, each swing arm assembly further comprises elastic members, each elastic member is disposed between the two connecting support arms, and the elastic members are disposed corresponding to the second adapter parts.

11. The hinge apparatus according to claim 10, wherein one of the connecting support arms comprises an insertion block, the other connecting support arm comprises an insertion slot, and the insertion block is inserted into the insertion slot in the movement direction of the synchronous slider.

12. The hinge apparatus according to claim 1, wherein each swing arm body comprises limiting surfaces facing the second adapter parts, at least part of each limiting surface is located in the relief space, and surfaces that are of the limiting guide track and that face the relief spaces abuts against the limiting surfaces in the movement direction of the synchronous slider.

13. The hinge apparatus according to claim 1, wherein the hinge apparatus further comprises elastic damping members, and the elastic damping member is disposed on at least one side of the synchronous slider in the movement direction of the synchronous slider.

14. The hinge apparatus according to claim 13, wherein the elastic damping member comprises an annular body, wherein the annular body comprises elastic arms and support arms, the two elastic arms are spaced apart, the support arms are connected to the two elastic arms, the elastic arms and the support arms are disposed alternately, one of the elastic arms is connected to the synchronous slider, and the other elastic arm is connected to at least one of the shaft cover and the limiting guide track.

15. The hinge apparatus according to claim 14, wherein the elastic damping member further comprises connecting support arms, wherein the elastic arms are connected to the connecting support arms, one of the connecting support arms on the elastic arms is connected to the synchronous slider, and the other connecting support arm on the elastic arm is connected to at least one of the shaft cover and the limiting guide track.

16. The hinge apparatus according to claim 15, wherein the elastic arm, the support arm and the connecting support arm are an integrally formed structure.

17. The hinge apparatus according to claim 1, wherein the synchronous sliders are slidably connected to the shaft cover.

18. The hinge apparatus according to claim 17, wherein the shaft cover comprises ribs, wherein the ribs are located at a side that is of the synchronous slider and that faces away from the limiting guide track, the ribs abut against a surface that is of the synchronous slider and that faces away from the limiting guide track, and the synchronous slider is slidably fitted to the ribs.

19. The hinge apparatus according to claim 18, wherein the shaft cover comprises a bottom plate and side plates, the bottom plate and the side plates form the accommodation recess parts, the ribs are formed on the bottom plate, and the limiting guide track is located at a side that is of the synchronous slider and that faces away from the bottom plate;

wherein each side plate is provided with relief notches, the swing arm bodies are located at the unfolded position, and the relief notches accommodate the swing arm bodies.

20. An electronic device, comprising:
a hinge apparatus, the hinge apparatus comprising:
a shaft cover, comprising accommodation recess parts;

bases, disposed in the accommodation recess parts, wherein each base comprises relief spaces and first adapter parts, the first adapter parts face the relief spaces, the base comprises a synchronous slider and a limiting guide track, the limiting guide track is connected to the shaft cover, the limiting guide track is disposed at a side that is of the synchronous slider and that faces away from the shaft cover, and the synchronous slider is slidably connected to the limiting guide track; and swing arm assemblies, each comprising swing arm bodies and second adapter parts, wherein each swing arm body comprises a connection end and a free end, the connection end is close to the base, the free end is away from the base, at least part of the connection end is located in the relief space, the second adapter parts are connected to the connection ends, the second adapter parts are rotatably connected to the first adapter parts, the second adapter parts are connected to the synchronous slider, the swing arm bodies rotate relative to the first adapter parts via the second adapter parts to switch between a folded position and an unfolded position, and the second adapter parts synchronously drive the synchronous slider to move between a first position and a second position; and the synchronous slider comprises first helical surfaces, the first helical surfaces are arranged corresponding to the first adapter parts, each first helical surface is located at a side that is of the first adapter part and that faces away from the relief space, each second adapter part comprises a second helical surface, the first helical surfaces are in contact with the second helical surfaces, helix directions of the first helical surfaces on the two sides of the swing arm body are identical, helix directions of the second helical surfaces on the two sides of the swing arm body are identical, when the second adapter parts rotate opposite to the first adapter parts, the first helical surfaces and the second helical surfaces slide relative to each other synchronously, to enable the second adapter parts to drive the synchronous slider to move.

* * * * *